US012594666B2

(12) United States Patent
Karydis et al.

(10) Patent No.: US 12,594,666 B2
(45) Date of Patent: Apr. 7, 2026

(54) SOFT PNEUMATIC HEXAPEDAL ROBOT, AND USES THEREOF

(71) Applicant: The Regents of the University of California, Oakland, CA (US)

(72) Inventors: Konstantinos Karydis, Riverside, CA (US); Zhichao Liu, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1060 days.

(21) Appl. No.: 17/560,075

(22) Filed: Dec. 22, 2021

(65) Prior Publication Data

US 2022/0193891 A1 Jun. 23, 2022

Related U.S. Application Data

(60) Provisional application No. 63/130,305, filed on Dec. 23, 2020.

(51) Int. Cl.
| | |
|---|---|
| *B62K 25/30* | (2006.01) |
| *B25J 9/14* | (2006.01) |
| *B25J 18/06* | (2006.01) |
| *B62D 57/02* | (2006.01) |
| *B62K 3/02* | (2006.01) |
| *B62K 25/04* | (2006.01) |

(52) U.S. Cl.
CPC .............. *B25J 9/144* (2013.01); *B25J 18/06* (2013.01); *B62D 57/02* (2013.01)

(58) Field of Classification Search
CPC ... B25J 9/144; B25J 18/06; B25J 15/06; B25J 5/00; B25J 13/081; B25J 9/16; B25J 9/163; B62D 57/02; F15B 13/04

USPC ................................. 180/8.1; 901/15, 22, 27
See application file for complete search history.

(56) References Cited

U.S. PATENT DOCUMENTS

| | | | | |
|---|---|---|---|---|
| 4,976,191 A | * | 12/1990 | Suzumori | F01B 19/00 92/48 |
| 5,823,389 A | * | 10/1998 | Guzowski | G01F 11/022 222/63 |
| 9,665,099 B1 | * | 5/2017 | Saunders | F16K 11/0856 |
| 2015/0283699 A1 | * | 10/2015 | Morin | B25J 9/142 901/22 |
| 2015/0375817 A1 | * | 12/2015 | Tolley | B25J 9/142 901/22 |
| 2017/0097021 A1 | * | 4/2017 | Ilievski | B25J 9/1075 |
| 2020/0362972 A1 | * | 11/2020 | Potter | G05D 1/021 |

* cited by examiner

*Primary Examiner* — Valentin Neacsu
*Assistant Examiner* — Nabin Kumar Sharma
(74) *Attorney, Agent, or Firm* — Morrison & Foerster LLP

(57) ABSTRACT

This disclosure relates to apparatus a multi-legged robot including at least one pair of actuators. Each actuator includes a pliable body. The pliable body includes a first portion having a first chamber, a second portion having a second chamber, where the second portion coupled to a distal end of the first portion. The pliable body includes a first inlet coupled to the first chamber, where the first portion is configured to bend upon receiving a first fluid via the first inlet and a second inlet coupled to the second chamber, where the second portion is configured to extend upon receiving a second fluid via the second inlet. The multi-legged robot includes a frame coupled to a proximate end of the first portion of each actuator.

16 Claims, 14 Drawing Sheets

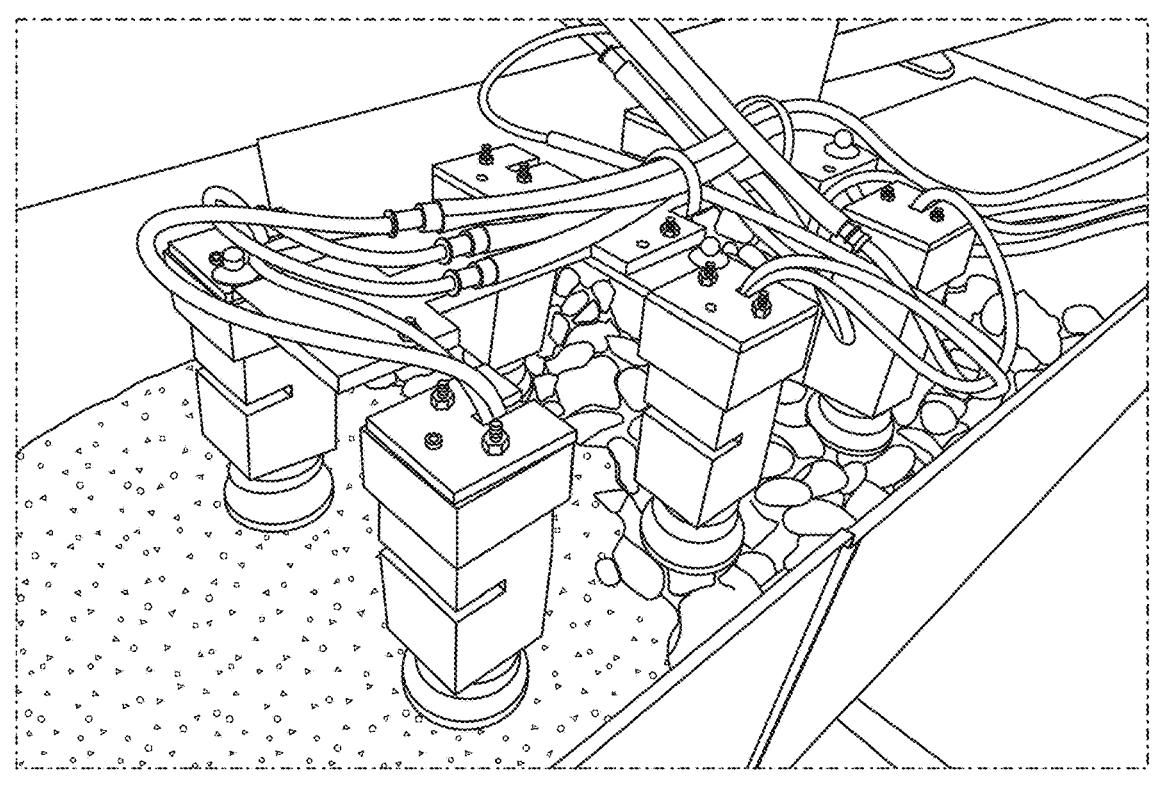
FIG. 1
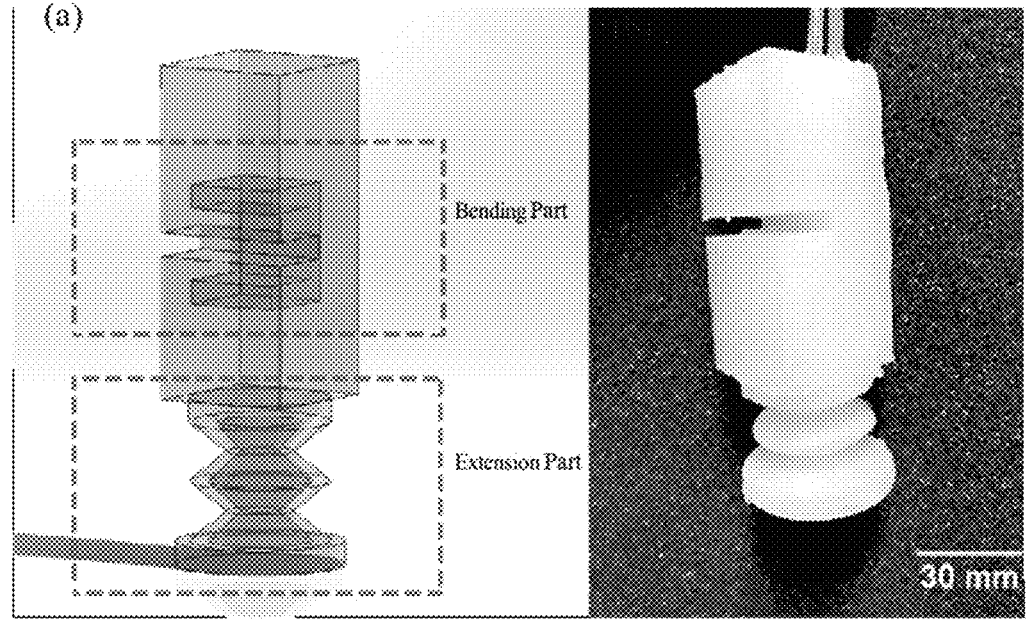
FIG. 2A  FIG. 2B

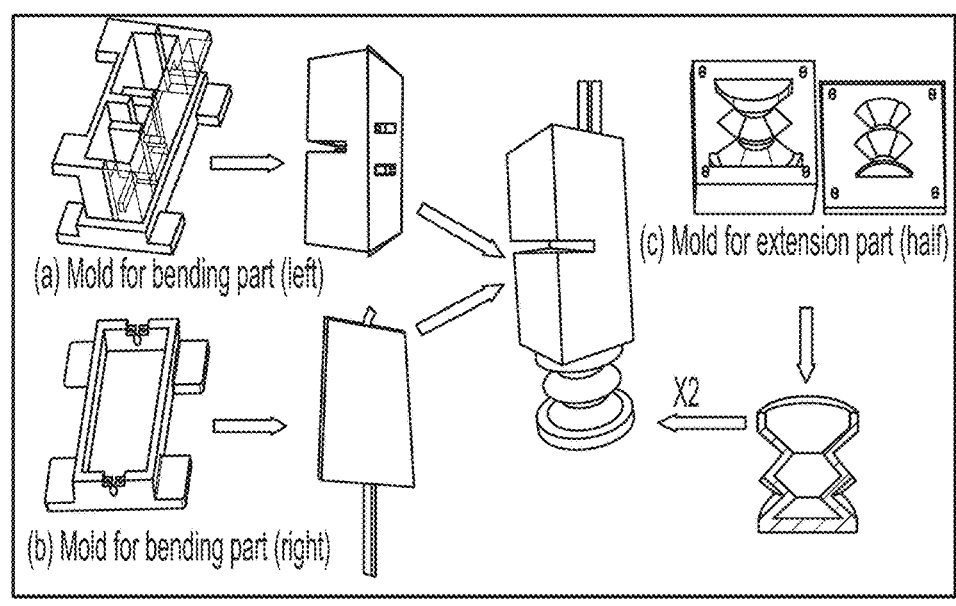
(a) Mold for bending part (left)
(b) Mold for bending part (right)
(c) Mold for extension part (half)
X2
FIG. 3
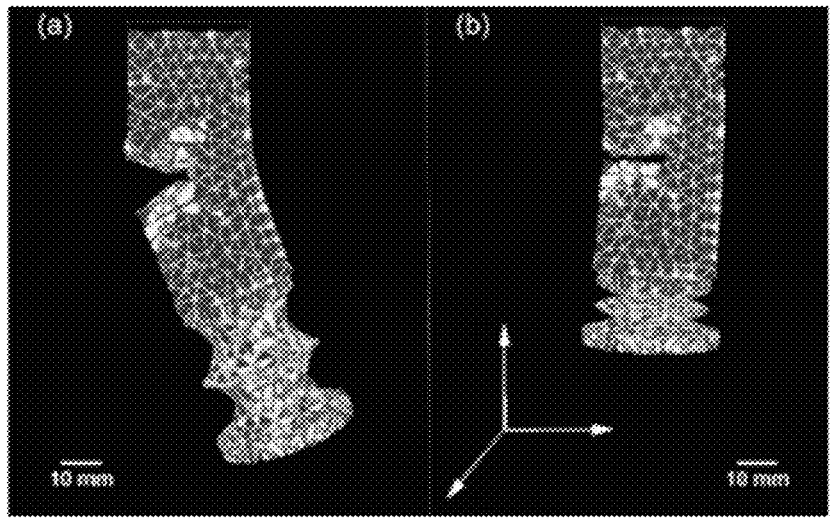
FIG. 4
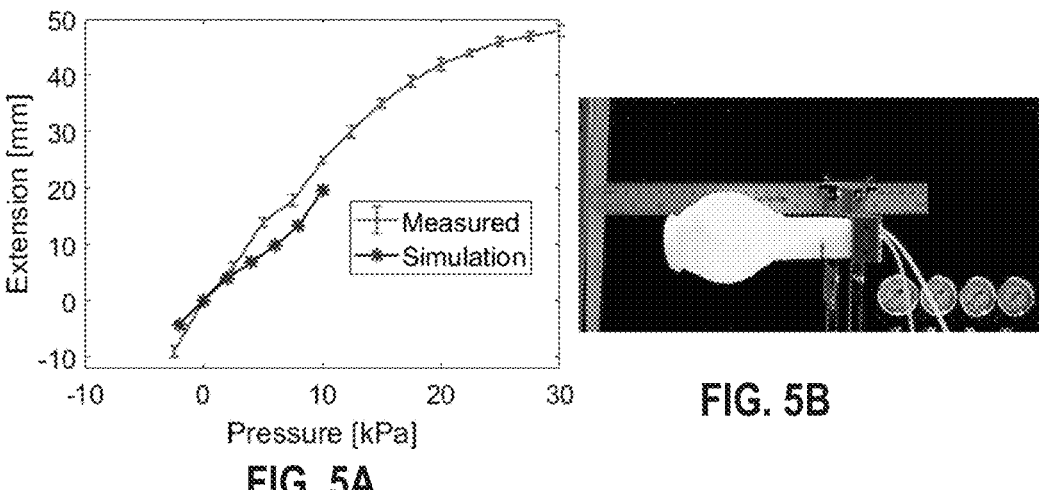
FIG. 5A
FIG. 5B

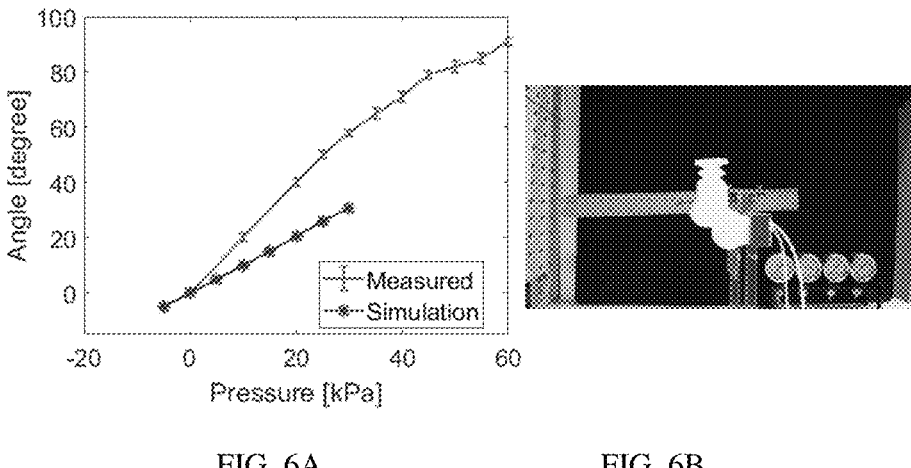
FIG. 6A                    FIG. 6B
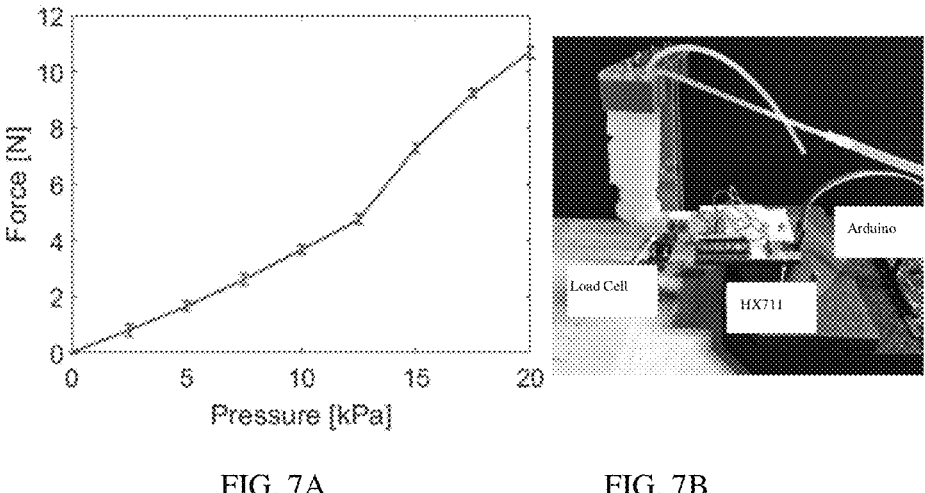
FIG. 7A                    FIG. 7B
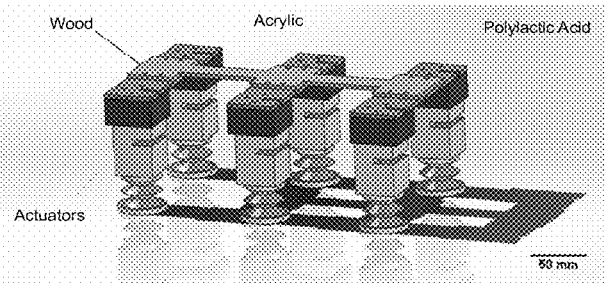
FIG. 8

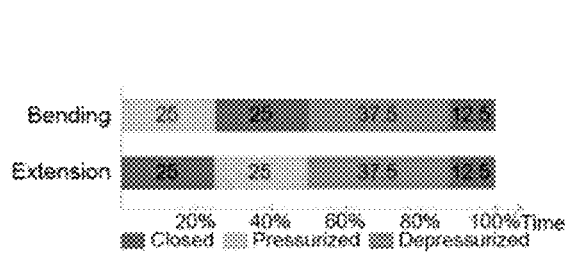
FIG. 9A
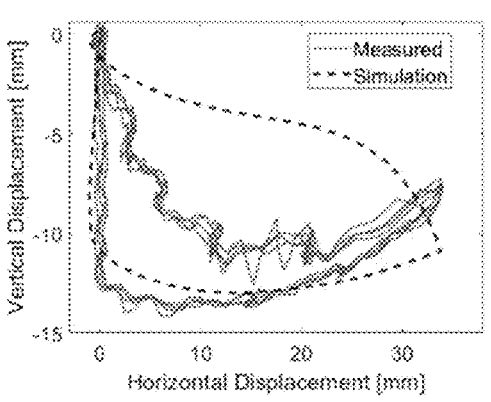
FIG. 9B
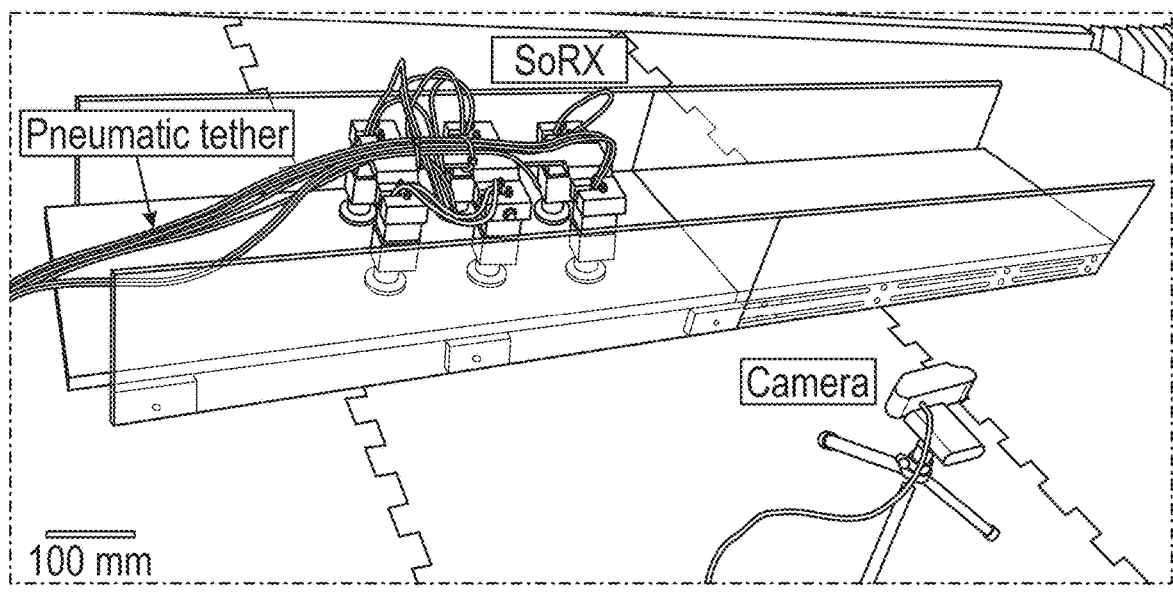
FIG. 10
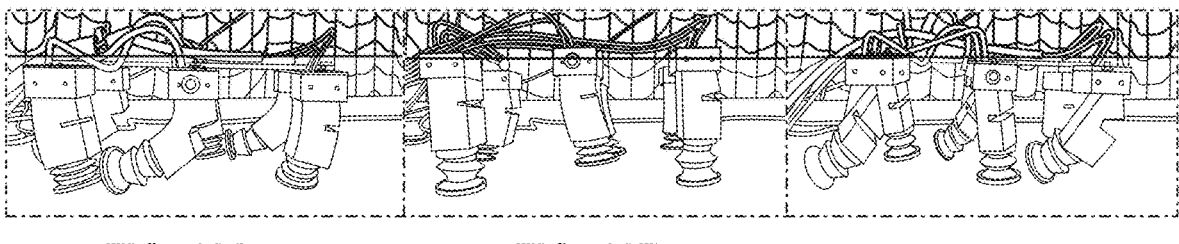
FIG. 11A          FIG. 11B          FIG. 11C

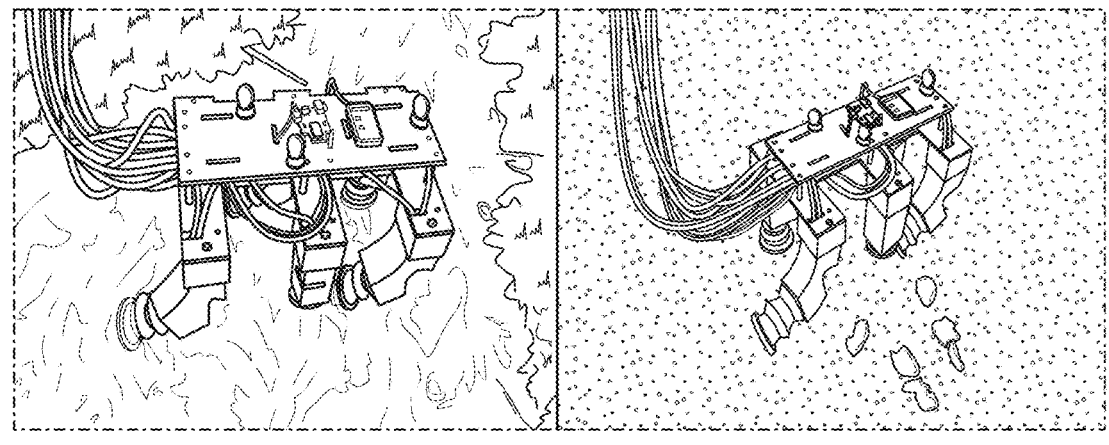
FIG. 18
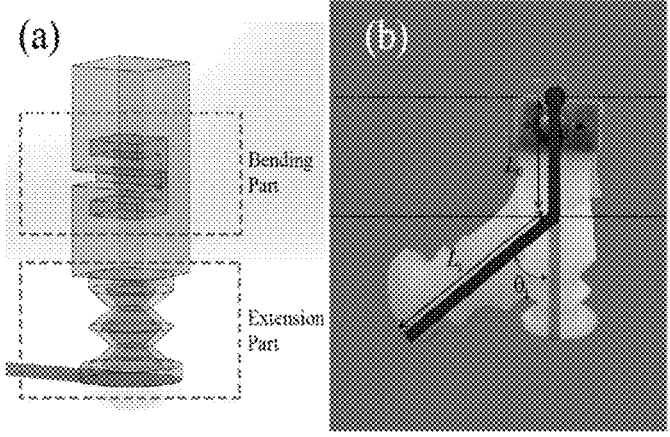
FIG. 19A          FIG. 19B
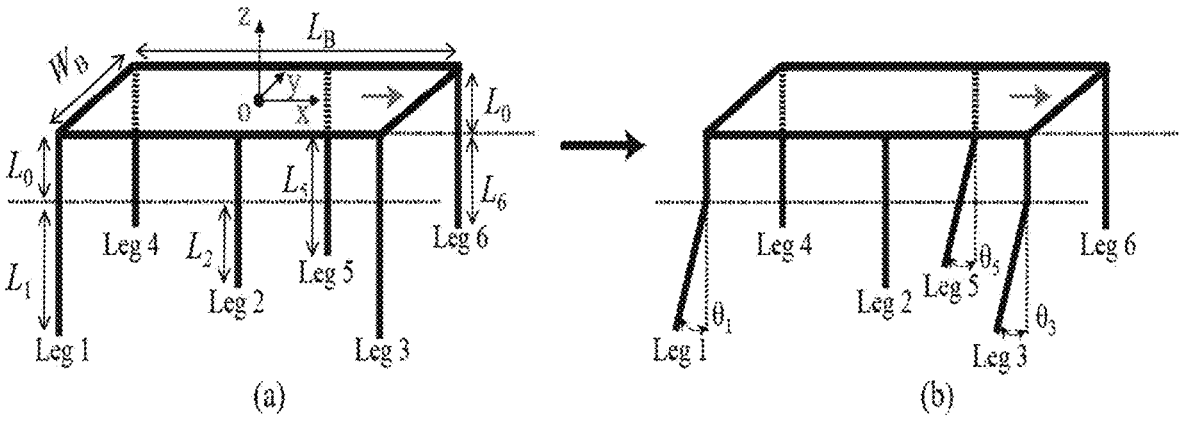
FIG. 20A          FIG. 20B

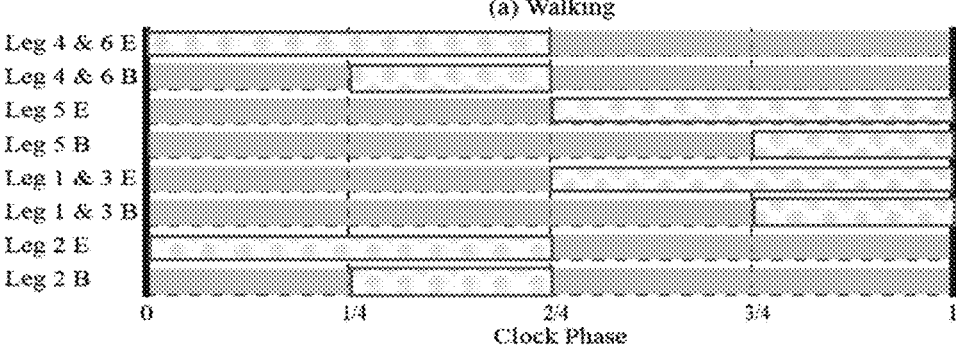
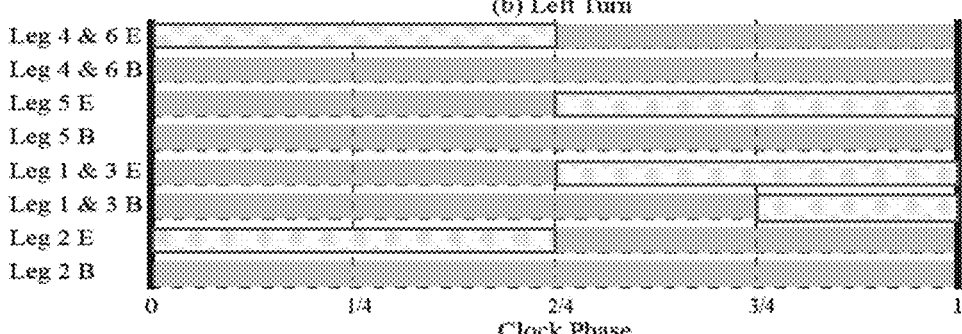
FIG. 25
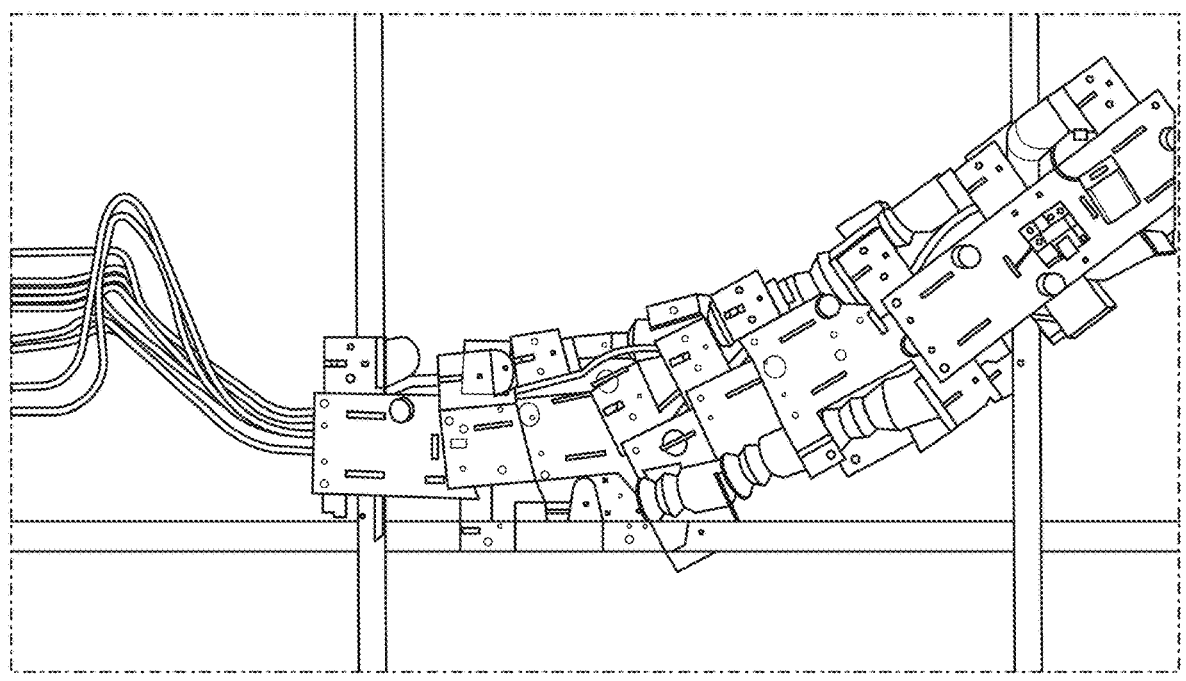
FIG. 26

SOFT PNEUMATIC HEXAPEDAL ROBOT, AND USES THEREOF

CROSS-REFERENCE TO RELATED APPLICATIONS

This application claims the benefit of U.S. Provisional Application No. 63/130,305, filed on Dec. 23, 2020, all of which are incorporated by reference herein.

GOVERNMENT LICENSE RIGHTS

This invention was made with government support under Grant No. U.S. Pat. No. 1,910,087 awarded by the National Science Foundation. The government has certain rights in the invention.

TECHNICAL FIELD

The present disclosure relates to flexible or soft actuators. More specifically, this disclosure relates to soft pneumatic robots for locomotion applications, including for traversing rough, steep and unstable terrain.

BACKGROUND

Multi-legged robots show promise in application areas such as search-and-rescue and intelligence-surveillance reconnaissance (ISR) where operation over rough and unstructured terrain is expected. However, achieving all-terrain mobility remains a challenging task, especially as robots scale down in size.

Adaptation to terrain variations is key for taking the robots outside of the protected laboratory environment, and deploying them in real-world settings. Studies have indicated that incorporating compliant legs, as animals have, can significantly improve the speed and stability of these robots in varying environmental conditions. Among the first efforts to incorporate passive mechanical compliance in robotic legs were the springy C-leg in the hexapedal robot RHex, which is still commonly used. Tunable devices were proposed to adjust the stiffness of legs. Direct-drive legged robots were also developed to achieve variable compliance.

There have been other attempts to achieve tunable stiffness using antagonistic pneumatic actuators such as Mckibben actuators and pleated pneumatic artificial muscles. However, these compliant legs come together with rigid parts, which limit the contact area along the length of legs, therefore reducing the ability to navigate rough terrain.

To address these deficiencies with robots having rigid legs, and/or actuators, "soft" robots began to take shape. Soft robotics generally refers to an area of robotics that relies on actuators that are formed from compliant and flexible material, such as various elastomeric materials, and includes soft and compliant actuating elements, such as pneumatics, cables, and the like. Soft robotics is a relatively young field, with challenges in design, fabrication and control. Soft robots are particularly appropriate for locomotion in uneven and/or sensitive environment, because their soft structure allows them to bend and squeeze to fit their shape around obstacles, and reduce the stress induced by contact over both surroundings and the robots surface.

Accordingly, what is still needed in the art is a multi-legged soft robot that is capable of traversing rough, steep and unstable terrain. Evaluating the performance of such a soft robot may include simulations and physical testing as well as a gait and locomotion analysis.

BRIEF SUMMARY

In some aspects, the present disclosure is directed to pneumatically actuated soft legged robots. A pneumatically-actuated soft legged robot may serve as a tool to applications where operation over rough and unstructured terrain is required, e.g., when looking for survivors in the aftermath of an earthquake. Operation in such terrains can challenge more rigid legged robots; instead, soft legged robots can squeeze and bend to overcome obstacles and fit into crevices to explore their environment.

In this disclosure, a novel pneumatically actuated soft hexapedal robot is discussed. The pneumatically actuated soft hexapedal robot utilizes a 2-DoF soft pneumatic actuator that can both bend and extend to create foot trajectory profiles that are appropriate for legged locomotion. Consistent with other hexapedal robots (and animals), the pneumatically actuated soft hexapedal robot employs an alternating tripod gait to propel itself forward. This disclosure shows that the alternating tripod gait can be utilized for effective locomotion of the pneumatically actuated soft hexapedal robot while traversing flat, rough, steep, and unstable (oscillating) terrains. Experiments reveal that the pneumatically actuated soft hexapedal robot can reach forward speeds of up to 0.44 BL/s, which makes it the fastest soft pneumatically actuated legged robot to date. The robot can climb over 15 mm tall obstacles, walk over terrains that contain rocks, sand, and combination of those, climb up to 10 deg slope, and walk inside 15 deg inclined grooves. The pneumatically actuated soft robot is also capable to run on an unstable platform oscillating at speeds comparable to the robot's forward speed without tipping over. These results suggest that compliance introduced through a purely soft leg design may create new opportunities for legged robots to navigate over challenging terrains.

BRIEF DESCRIPTION OF THE DRAWINGS

The present application can be understood by reference to the following description taken in conjunction with the accompanying figures.

FIG. 1 shows a soft-legged robot according to one or more embodiments of the disclosure.

FIG. 2A shows a perspective view of an actuator of a soft-legged robot according to one or more embodiments of the disclosure.

FIG. 2B shows a perspective view of a soft-legged robot according to one or more embodiments of the disclosure.

FIG. 3 shows a fabrication process of an actuator of a soft-legged robot according to one or more embodiments of the disclosure.

FIG. 4 shows a finite element analysis model of an actuator of a soft-legged robot according to one or more embodiments of the disclosure.

FIG. 5A is a plot showing the simulated and measured extension of a soft-legged robot according to one or more embodiments of the disclosure.

FIG. 5B shows extension of an actuator of a soft-legged robot according to one or more embodiments of the disclosure.

FIG. 6A is a plot showing the simulated and measured rotation of a soft-legged robot according to one or more embodiments of the disclosure.

FIG. 6B shows bending of an actuator of a soft-legged robot according to one or more embodiments of the disclosure.

FIG. 7A is a plot showing the simulated stiffness of a soft-legged robot according to one or more embodiments of the disclosure.

FIG. 7B shows an actuator of a soft-legged robot according to one or more embodiments of the disclosure.

FIG. 8 shows a perspective view of a soft-legged robot according to one or more embodiments of the disclosure.

FIG. 9A shows an actuation sequence for an actuator of a soft-legged robot according to one or more embodiments of the disclosure.

FIG. 9B shows the displacement of an actuator of a soft-legged robot according to one or more embodiments of the disclosure.

FIG. 10 shows a soft-legged robot according to one or more embodiments of the disclosure.

FIGS. 11A-11C show a soft-legged robot according to one or more embodiments of the disclosure.

FIG. 18 shows a soft-legged robot on natural unstructured terrain.

FIG. 19A shows a CAD rendering of an actuator, according to one or more embodiments of this disclosure.

FIG. 19B shows a static model based on geometric constraints according to one or more embodiments of this disclosure.

FIGS. 20a-20b show quasi-static forward motion of a soft-legged robot according to one or more embodiments of this disclosure.

FIGS. 25a and 25b show actuation sequences according to one or more embodiments of this disclosure FIG. 26 shows composite images of a sample test on turning.

DETAILED DESCRIPTION

Figure 12:
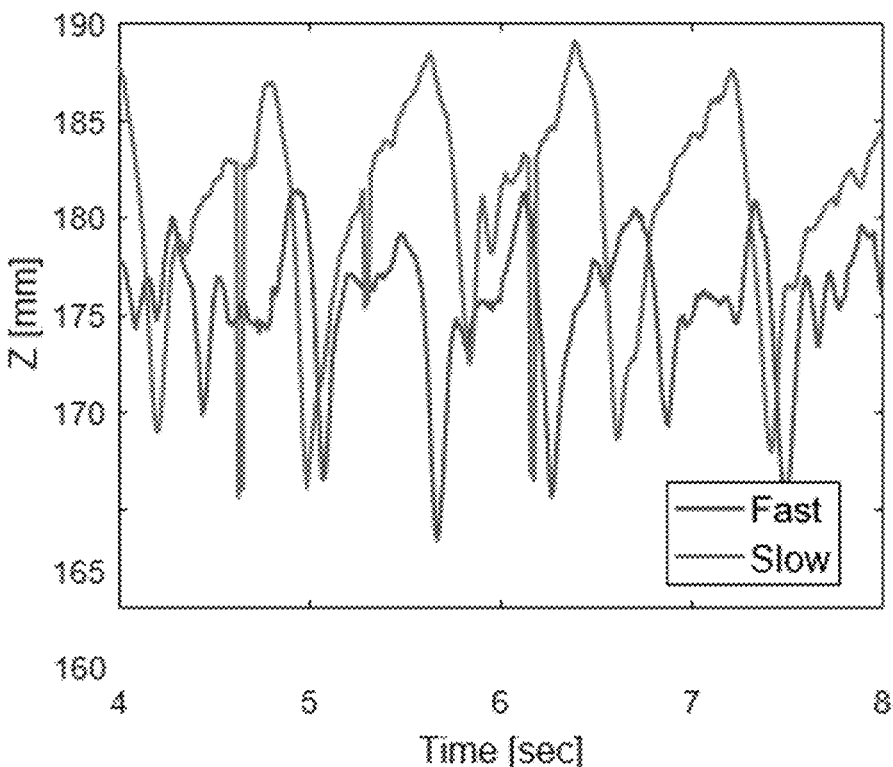
FIG. 12 is a plot showing forward trajectories of a soft-legged robot according to one or more embodiments of the disclosure.

In the following description of examples and embodiments, reference is made to the accompanying drawings which form a part hereof, and in which it is shown by way of illustration specific examples that can be practiced. It is to be understood that other examples can be used and structural changes can be made without departing from the scope of the disclosed examples.

Soft Robots

Soft robotics have been investigated and developed for locomotion applications. Prior work includes soft robots powered by soft pneumatic actuators (SPA) to achieve crawling and undulation gaits. A starfish-like soft robot was developed to complete crawling gaits actuated by shape memory alloys. However, the actuators of soft robots only have only one degree of freedom (DoF), e.g., bending. Further, soft robots to date are unable to traverse over rough terrain as more rigid legged robots do. Notable exceptions include a robot that combines soft legs with wheels for navigation on uneven terrain, and a soft-material 3D-printed pneumatic legged robot able to lift its legs off the ground and walk over unstructured terrain. Nevertheless, these robots rely on either rigid wheels or multiple leg configurations to achieve all-terrain locomotion. Moreover, unlike hexapedal robots, they cannot sustain a large support area, as with alternating tripod gaits, which can be advantageous when traversing uneven terrain.

There are other attempts to achieve soft legged locomotion by leveraging cable-driven actuators. The Sofia walking robot and Puppy utilize model-based optimal control to achieve walking locomotion. The cable-driven legs have two DOFs: bending and extension. Compared to pneumatic actuators, cable-driven actuators may be more direct to model and control. However, cable-driven actuators can be challenged when it comes to varying leg stiffness to adapt to terrain variations. Moreover, the necessary motors may render cable-driven robots top-heavy and thus unstable.

To design an all-terrain soft legged robot, each leg must be sufficiently compliant to adapt to obstacles, while stiff enough to support the robot's weight. In some embodiments, soft pneumatic actuators (SPAs) are used to balance this trade-off. For example, SPAs for legged locomotion can include pneumatic networks (PneuNets) and multiple bellowed chambers. However, these actuators can only bend but not extend. In other words, these actuators may have a single degree of freedom, e.g., bending. This may constrain the locomotion capabilities of the robot in practice.

FIG. 1 illustrates an exemplary soft robot according to embodiments of this disclosure. For example, a soft robot in according to embodiments of this disclosure may include two or more SPA legs. Referring to FIG. 2, the SPA legs or actuators can include at least two portions or parts: 1) a bending part and 2) the extension part. In some embodiments, the bending portion can include one or more cuts. In some embodiments, the extension portion may include a hyper-elastic bellow (HEB) actuator design. When the two parts are pressurized, the actuator can both bend and extend.

In some embodiments, each portion may be actuated, e.g., pressurized separately. In other words, the bending portion may include a chamber that can be pressurized separately from a chamber located in the extension portion. Different pressurization/depressurization cycles can then yield a multitude of distinct foot trajectory profiles as discussed in further detail below.

Fabrication

FIG. 3 illustrates an exemplary fabrication process. A soft-robot according to embodiments of this disclosure may be fabricated from a soft elastomeric material. In some embodiments, each actuator, e.g., leg, can be cast separately out of two-part silicone elastomer, for example, Dragon Skin 10 FAST, Smooth-On. In some embodiments, the molds to cast each actuator may be 3D-printed using, for example, Onyx material on Markforged Mark Two carbon fiber 3D printer. Referring to FIG. 3, in some embodiments, there may be three separate molds used to form each actuator. For example, the bending portion may be formed using two pairs of molds to form the chamber and button layer. In some embodiments, the extension portion may be formed using a single mold.

In some embodiments, fabrication of a leg may include at least four steps. 1) Mix the elastomer and process it in vacuum chamber to remove bubbles. 2) Pour the elastomer into the molds and wait 75 minutes for it to cure, and demold the pieces. 3) Use an adhesive (for example, Sil-Poxy, Smooth On) to bond together the two pieces of the bending part. Meanwhile, glue two same silicone bodies made by mold (c) in FIG. 3 to form the extension part. 4) Insert silicone tubes for air connection and bond the two-actuator parts.

Example Simulated Actuator Behavior Analysis

In some examples, it may be desirable to simulate the design of a soft robot according to embodiments of this disclosure. Doing so may guide the design and to ensure the proposed design can work as intended in real-time. In some embodiments, Finite Element Method (FEM) analysis can be used to simulate large non-linear deformations undergone by soft structures. At each step i of the real-time simulation, the internal forces can be linearized as $$f(xi) \approx f(xi-1) + K(xi-1)dx \tag{1}$$

where f is the volumetric internal stiffness force at the nodes, and K(x) represents the tangent stiffness matrix. Assuming quasi-static motions, the model is in equilibrium in terms of internal and external forces, that is $$-K(xi-1)dx = p + f(xi-1) + J\lambda, \tag{2}$$

where p stands for the external forces, λ represents the contributions of the actuators and the contact forces (if applicable) and J gathers the directions.

To solve for node displacements, we first a free configuration $x^{free}$ can be determined by solving (2) with λ=0. The result also yields $\delta^{free}$ which is the violation for constraints. Then, a constraint-based solver computes/given laws of the constraint between δ and λ, that is $$\delta = \underset{W}{\underline{JK^{-1}J^T}}\lambda + \delta^{free} \tag{3}$$

Finally, node displacements are calculated using the value of the constraint response $$x^1 = x^{free} + K^{-1}J^T\lambda \tag{4}$$

In some examples, these steps can be implemented in SOFA with, for example, a Soft Robot-Plugin.

FIG. 4 illustrates an exemplary simulation when the actuator is pressurized and depressurized. For example, this figure shows a finite element analysis of a single leg or actuator of a soft robot according to embodiments of this disclosure. As shown, the mesh file can include at least 13,344 tetrahedra and at least 3,352 nodes. In some embodiments, elastic and inertial parameters can be tuned in the simulation. The Young's modulus can be obtained based on an elastomeric material, e.g., silicone properties, that can be used to form the leg of the actuator. In some examples, the mass of the actuator can be measured experimentally.

Example Actuator Performance

In some examples, the properties of the actuator, e.g., legs, regarding extension, bending, and stiffness-varying may impact on the utility of the soft legged robots. To this end, empirical tests can be conducted to validate simulation results, and to evaluate the performance of the actuator prototype.

For example, referring to FIG. 5A, to measure extension and bending, the actuator can be mounted horizontally. During the measurements, the extension and bending portions can be pressurized/depressurized at a predetermined increment, e.g., 2.5 kPa increments.

FIG. 5B illustrates an exemplary experimental setup for the extension measurements. In some embodiments, the position of the actuator's free end can recorded. In some embodiments, in simulation, the direction of gravity can point in the negative direction along Y-axis to match the experimental setting (see, e.g., FIG. 4). In some examples, to represent the additional rigidity created by the silicone tube in the bending part, a model of stiff springs in the direction of the tubes can be used. The position of the corresponding node can be exported via a Python script in the modeling software, e.g., in SOFA. FIG. 5B shows the experimentally measured values and the simulation values. As seen in FIG. 5A, the experimental values match the simulation data. In some embodiments, the extension part can elongate by 48 mm at 30 kPa and be shortened by 9 mm in depressurization. In some examples, the simulation may diverge from experimental values when pressure values extend beyond the range of −2 kPa to 10 kPa.

In the bending test, bending angles were measured as input pressure was varied. FIG. 6 illustrates the results. For example, as shown in FIG. 6, the actuators according to embodiments of this disclosure can bend 91 deg at 60 kPa. In some examples, angles in simulation are smaller than the measured ones. In some examples, simulations and measured values can diverge when the input pressure exceeded 30 kPa.

In bending and extension tests, there may be mismatch between the measured and simulated results. This mismatch may be caused by approximations in material properties such as Young's modulus and Poisson ratio, 3 measurement errors, and vibrations caused while the actuator was pressurized.

Additionally, the force generated by the actuator as a function of the input pressure to illustrate the actuator's stiffness-varying property can be measured. FIG. 7 illustrates an exemplary experimental set-up to measure the actuator's stiffness varying property. In some examples, this measurement may be taken by mounting the actuator vertically above a load cell with, for example, an amplifier HX711 and microcontroller Arduino Mega. As seen in FIG. 7, the actuator can be in contact with the load cell when the pump was switched off. Input pressure values ranged from 0 kPa to 20 kPa. Results indicate that the actuator can apply 10.67 N at 20 kPa. As such, soft robots in accordance with embodiments of this disclosure can lift a weight of 3.26 kg. In some examples, soft robots in accordance with embodiments of this disclosure may do so while follows an alternating tripod gait. Although, the bending portion was not activated during this measurement, as pressure increases over a critical point, the leg will passively bend; this effect can lead to the sharp increase observed in FIG. 7 at approximately 13 kPa.

Example Soft Robot Design and Gait Analysis

Soft actuators according to embodiments of this disclosure are used to create the pneumatically actuated soft robotic hexapod as shown in at least FIGS. 1 and 8. A soft robotic hexapod according to embodiments of this disclosure may measure 230 mm L×140 mm W×100 mm H and weighs 650 g. The frame of A soft robotic hexapod according to embodiments of this disclosure can be manufactured by combining laser-cut wood and acrylic sheets (e.g., Universal Laser Systems VLS 3.60 laser cutter), and six 3D-printed leg holders (e.g., Makerbot Replicator+3D printer).

Embodiments a soft robotic hexapod according to this disclosure can employ an alternating tripod gait for locomotion. Static stability can be improved with alternating tripods by keeping the center of mass within the support area formed by the three legs that touch the ground.

To achieve effective locomotion a cyclic control trajectory for the feet of the robot can be determined. Determining pressurization/depressurization sequences for pneumatically actuated soft legged robots is a challenging task. For example, available simulation tools yield quite different results from those observed in practice. Embodiments in accordance with this disclosure include a pressurization/depressurization sequence that can lead to effective locomotion. The sequence is shown in FIG. 9A. Bending and extension parts are pressurized sequentially, and then they are depressurized simultaneously. Temporal duration ratios remain fixed; changing the total cycle time leads to different forward velocities.

To identify the nominal foot trajectory, the actuator can be mounted vertically as in the stiffness-varying test. In some examples, the vertical axis points to the opposite direction of gravity, thus the vertical displacements are negative. An entire actuation sequence can be applied to the actuator while the camera recorded motion. Resulting image frames were post-processed and analyzed, for example, with the video analysis software Kinovea. Meanwhile, the same actuation sequence can be applied in simulation. Exemplary trajectories are shown in FIG. 9B. As shown in FIG. 9B, the foot returns to its original starting point after one stride despite the very compliant nature of the leg. In some examples, a maximum foot clearance of about 14 mm can be recorded. Device vibrations may cause non-smooth points in the trajectory. Further, in some examples the bending part may respond faster to differential pressure inputs than the extension part. The last two points are the major differences between simulation and experiment (i.e. trajectories are smoother, and actuators respond equally fast in simulation). These differences may be caused by the various approximations noted previously, but also by the fact that the simulation relies on the assumption of quasi-static motions, which is not met in rapid actuation cycles needed in practice.

Exemplary Experimental Evaluation

The motion capabilities of robots according to embodiments of this disclosure were evaluated through five experiments: running, step climbing, and traversing rough terrain, steep terrain, and unstable terrain. A modified version of an open-source pneumatic control board was used in all experiments. In a pneumatic control board according to embodiments of this disclosure, every air output channel can be connected to two pairs of valves and pumps to allow for both pressurization and depressurization. The primary experimental testbed is shown in FIG. 10. At this stage, the robot runs in open loop (i.e. without steering control); hence, two acrylic panels can be used to ensure the robot does not fall off from the platform. The length of the platform is 1.2 m. A 12-camera VICON motion capture system may be used to collect position and velocity data of the center-of-mass (COM) of a soft robot according to embodiments of this disclosure.

Experimental Evaluation—Running

A soft robot according to embodiments of this disclosure can reach a top speed of 0.44 body lengths per second (BL/s), or 101 mm/s, at maximum actuation pressures of 34 kPa for the bending part and 10 kPa for the extension part. FIG. 11 depicts an instance of the robot running. Compared to other soft robots, a soft robot according to embodiments of this disclosure can run significantly faster both in terms of body length and absolute distance (Table I). To the best of our knowledge, a soft robot according to embodiments of this disclosure is the fastest to date pneumatically actuated soft legged robot.

TABLE I

| Speeds for soft robots | | |
| Robots | Speed [BL/s] | Speed [mm/s] |
| --- | --- | --- |
| SoRX | 0.44 | 101.0 |
| Quadrupedal | 0.14 | 20.0 |
| Puppy | 0.12 | 15.6 |
| Multigait | 0.05 | 6.7 |
| Five-limb | 0.003 | 0.43 |

Further, running tests at two distinct speeds set at 0.35 BL/s and 0.44 BL/s, were performed to capture the evolution of the position of the soft robot's COM in forward motion. Results reveal that the robot's COM follows a repeatable cyclic pattern (FIG. 12). This observation is consistent with the CoM evolution of more rigid legged robots, suggesting that related tools to study stability and to design motion planners and controllers may be appropriate for soft legged robots as well.

Experimental Evaluation—Step Climbing

Figure 13:
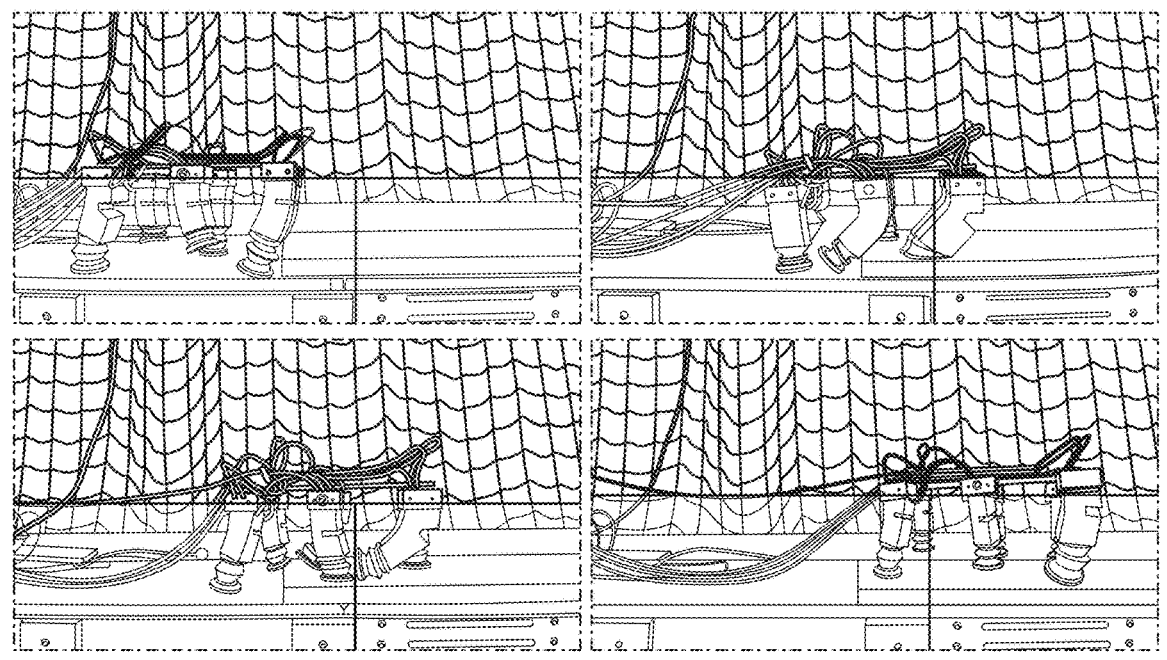
FIG. 13 shows a soft-legged robot according to one or more embodiments of the disclosure climbing over a vertical obstacle.

A soft robot according to embodiments of this disclosure was able to overcome obstacles up to 15 mm tall passively and while following the same alternating tripod gait used for running (FIG. 13). In some embodiments, leg softness may play a dual positive role. First, leg softness can improve locomotion robustness by enabling the soft robot to recover when one leg gets stuck on the obstacle. Second, it may help overcome obstacles larger than the nominal foot clearance. For example, recall the nominal foot clearance was measured at 14 mm in static single-leg tests shown in FIG. 5. In both cases, a leg may forcibly squeeze or over-extend beyond the range prescribed through its actuated values without any damage if forces remain below the silicone's yield point.

Experimental Evaluation—Traversing Rough Terrain

Figures 14A, 14B, 14C:
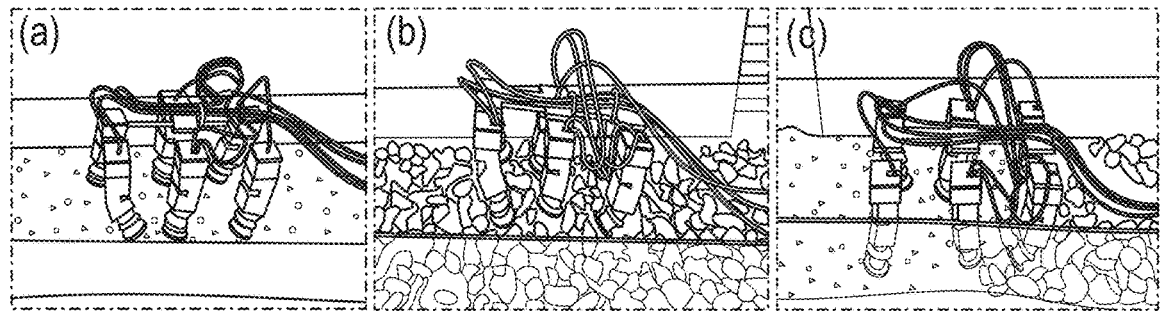
FIGS. 14A-14C show a soft-legged robot according to one or more embodiments of the disclosure.

To evaluate the robot's capability to traverse rough terrain, locomotion over sand, rocks, and a mixed terrain (FIG. 14) was performed and measured. The mixed terrain consisted of two flat ground parts at the two ends, as well as sand and rocks parts in the middle.

Figure 15:
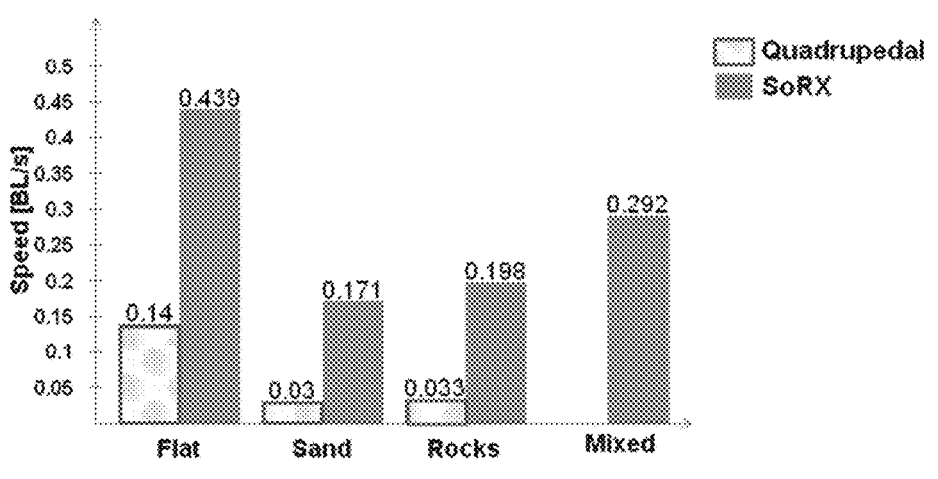
FIG. 15 is a plot comparing the speeds across different terrain of a four-legged robot and a soft-legged robot according to one or more embodiments of this disclosure.

The speed of the robot while traversing rough terrain is compared to the speed of Quadrupedal robot, e.g., a rigid four-legged robot with mechanical actuators. The Quadrupedal was tested with small pebbles and large rocks. Therefore, the speed of a soft robot according to embodiments of this disclosure over sand is compared to the one of Quadrupedal over small pebbles. Results (shown in FIG. 15) demonstrate that the soft robot is able to navigate much faster on all types of terrain. Unlike Quadrupedal, the soft robot uses one leg configuration that is adequate for flat ground and rough terrain alike. The speed of the soft robot over mixed terrain suggests that keeping the same gait pattern and control effort may suffice to traverse different types of terrain.

Experimental Evaluation—Traversing Steep Terrain

Walking over inclined surfaces has been a challenging task for all legged robots. For example, a spherical soft robot was able to climb a slope with crawling gaits. A compliant cable-actuated four-legged robot (e.g., "Puppy") can walk up a hill only in simulation.

Figures 16A, 16B:
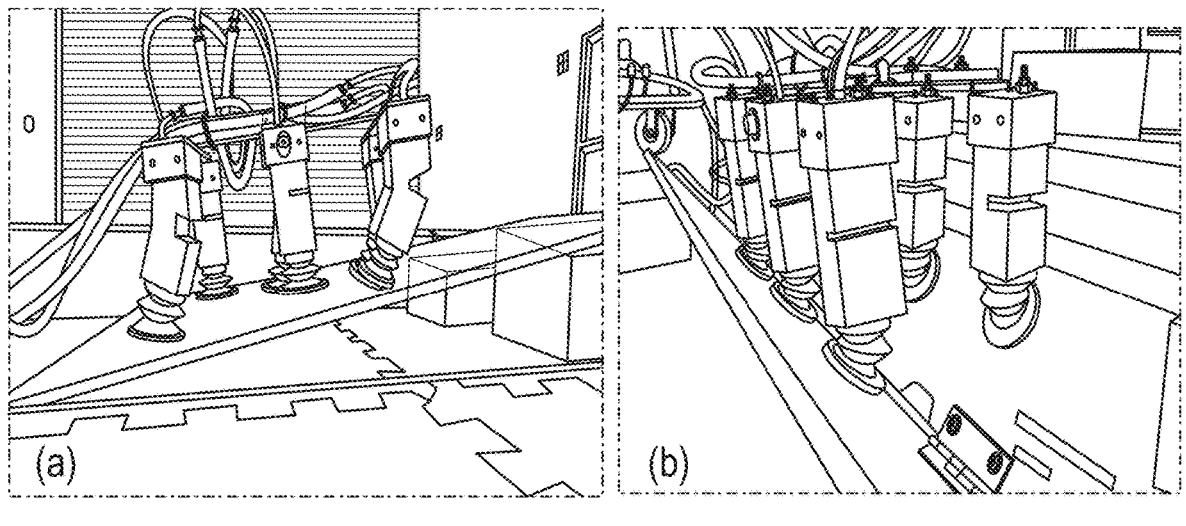
FIGS. 16A-16B show a soft-legged robot according to one or more embodiments of the disclosure.

Two experiments were implemented to test the soft robot's locomotive performance on steep terrain: 1) walking on an inclined flat surface, and 2) walking inside an inclined groove. The robot was able to climb up to a 10 deg angled flat surface made of acrylic sheet as shown in FIG. 16A while employing the same alternating tripod gait as in running over flat and rough terrain and climbing over a step. Moreover, the robot was able to traverse a 15 deg inclined groove made of two flat acrylic sheets as shown in FIG. 16B. In some examples, the actuators can bend and squeeze to fit the high-slop surface. Unlike Quadrupedal, the soft robot according to embodiments of this disclosure does not require any additional leg configuration to handle steep terrain.

Experimental Evaluation—Traversing Unstable Terrain

Figure 17A:
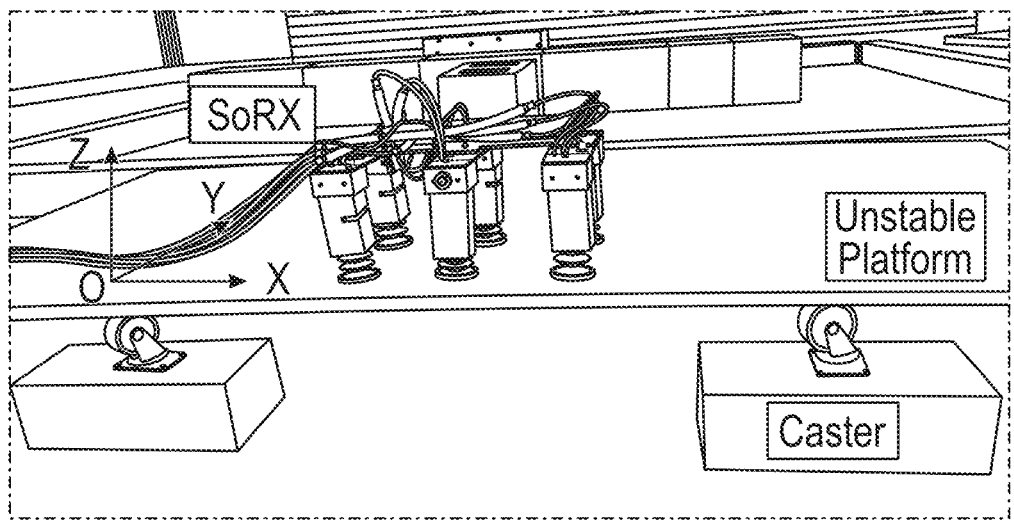
FIG. 17A shows a soft-legged robot according to one or more embodiments of the disclosure.

To further evaluate the robustness of the soft robot's running performance, the soft robot traversed an unstable (oscillating) platform. The experimental setup consisted of four caster wheels supporting a wooden sheet; see FIG. 17A. The platform oscillated in the X-Y plane while the soft robot ran on top of the oscillating platform.

Figure 17B:
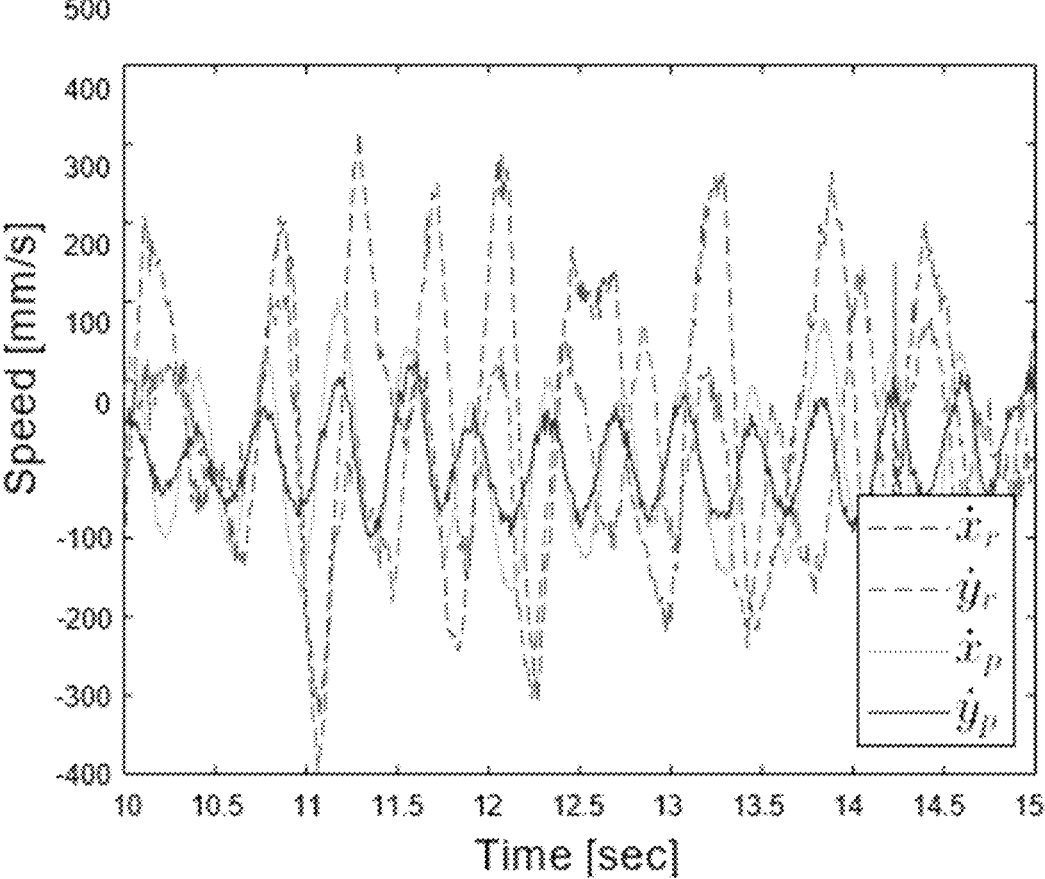
FIG. 17B is a plot showing the speed of a soft-legged robot and an unstable platform.

FIG. 17B superimposes the speed of the soft robot and of the oscillating platform's as measured through motion capture. The soft robot was able to run on the platform without tipping over despite the platform oscillating at speeds comparable to the robot's forward velocity. Accordingly, a soft robot according to embodiments of this disclosure that employs an alternating tripod gait, paired with soft legs appears to yield a robust running.

A soft robot according to embodiments of this disclosure may have a number of practical applications. For example, as discussed above, a soft robot according to embodiments of this disclosure (e.g., a pneumatically actuated soft legged robot) may serve as a tool to applications where operation over rough and unstructured terrain is required, e.g., search-and-rescue and intelligence-surveillance reconnaissance applications. Operation in such terrains still challenges more rigid legged robots; instead, soft legged robots could squeeze and bend to overcome obstacles and fit into crevices to explore their environment. In some examples, a soft robot according to embodiments of this disclosure may be used to survey agricultural land. In some examples, a soft robot according to embodiments of this disclosure may be used to move objects and/or people, for example, a soft robot may be configured to move patients in a hospital. In each of these examples, a soft robot according to embodiments of this disclosure may include a plurality of sensors to aid in the performance of a pre-determined function, e.g., search-and-rescue, agricultural survey, etc.

Accordingly, a soft robot in accordance with embodiments of this disclosure provides a pneumatically actuated soft robot. The soft robot can include 2-DoF soft pneumatic actuators that can both bend and extend to create foot trajectory profiles that are appropriate for legged locomotion. Consistent with other hexapedal robots (and animals), the soft robot may employ an alternating tripod gait to propel itself forward. Moreover, a soft robot according to embodiments of this disclosure may further provide an energy efficient robot that does not require configuration to stand, e.g., air is not required to be pumped into the soft robot for it to be in a standing position.

Although the disclosed examples have been fully described with reference to the accompanying drawings, it is to be noted that various changes and modifications will become apparent to those skilled in the art. For example, although specific examples of this disclosure, discussed soft robots less than 250 mm in length, a skilled artisan would understand that the actuators of the soft robot can be scaled up in size and operate in much the same way. Additionally, while this disclosure discusses a tethered robot, a skilled artisan would understand modifications including an untethered operation while keeping the size and weight of the robot within reasonable limits may be contemplated. Additional motion capabilities, such as turning and moving backward can be explored. Moreover, the effect of different elastic modules and stiffness of the flexible legs on the moving performance may be considered as well as control strategies for trajectory tracking and enable a soft pneumatic robot to work autonomously, untethered, and with integrated sensing capabilities. A skilled artisan would understand that certain design considerations may have to be taken into account when scaling up, for example, the wall thickness of the actuators. In some examples, elements of one or more implementations may be combined, deleted, modified, or supplemented to form further implementations. Such changes and modifications are to be understood as being included within the scope of the disclosed examples as defined by the appended claims.

Position Control and Variable Height Trajectory Tracking

Multiple types of rigid robots (e.g., industrial robots used in manufacturing) have been successfully endowed with rapid and precise motion control capabilities. However, the high stiffness of the body, as well as the high-gain feedback control can introduce a risk of bodily injuries, especially in cases where interactions with humans are involved. In contrast, soft robots can enable safe interaction with humans, high power-to-weight ratio, adaptation to the interacting environment, and comparatively lower fabrication cost.

As discussed above, various actuation methods have been developed for soft robots. Some representative examples include pneumatic, hydraulic, cable-driven, and shape-memory alloy (SMA) systems. Among those methods, pneumatic actuators have been observed to facilitate legged robots' adaptation to various types of terrain, thus making them a suitable candidate for use in the context of robotic locomotion.

The soft pneumatic actuator with two degrees of freedom (DoFs) described above can both bend and extend to create foot trajectory profiles suitable for legged locomotion. Based on this actuator, a soft hexapedal robot can operate over a range of challenging environments, such as rough, steep, and unstable terrain, without any additional control effort and by following the same feedforward control strategy (an alternating tripod gait scheduler) across these various terrains. FIG. 18 illustrates outdoor operations for a soft hexapedal robot according to embodiments of this disclosure.

The soft pneumatic legged robots may have limitations, as they rely on empirically hand-tuned input sequences for open-loop control. Meanwhile, a lack of mathematical models makes it difficult to utilize model-based controllers for precise motion control. In one or more examples, a soft pneumatic legged robot can be powered by electronics-free pneumatic circuits. However, in such examples the robot still may include tethered manual control for locomotion and collision avoidance.

Model-based motion control for soft pneumatically actuated robots can be challenging due to the nonlinear properties of soft materials and generally slow responses to actuation. Past research on soft pneumatic robots' modeling and control has mostly focused on single actuators or soft manipulators. Model-based control of continuum manipulators with relatively higher stiffness has been well-studied. Piecewise constant curvatures and variable curvature models have been proposed to achieve feed forward control. Other attempts include Cosserat rod, mass-damper-spring-based, linear parameter-varying, and finite element method-based models. Those models have then been used to develop various feedforward or feedback control methods, including proportional-integral-derivative (PID), sliding mode, model predictive control, and learning-based methods.

These methods, however, may be limited in their application to the control of soft pneumatically-actuated legged robots in three main ways: 1) The methods may fail to incorporate frequent and periodic interactions with the environment, which are common in legged locomotion; 2) the methods may take a small number of actuators into account, while controlling soft legged robots is more complicated since the robots usually have at least four legs and each leg has at least two actuated DoFs; and 3) the methods may rely on relatively costly and large valves or pressure sources for fast and precise airflow regulation; high cost prohibits scaling to multiple channels of actuation while the size and weight restrict mobility.

Past research on motion control of soft pneumatic mobile robots has primarily focused on planar locomotion, featuring soft robotic snakes. However, these robots rely on traditional rigid wheels for contacting with the surface, limiting the ability to adapt to various terrain. A recent work presents a continuum soft robot capable of tracking trajectories and interacting with the environment. Nevertheless, robot movement is still limited to 2D space.

According to embodiments of this disclosure, a static model can be used for feedforward position control (body height and orientation) of a soft pneumatic legged robot. Embodiments of the present disclosure include a low-cost pneumatic regulation board that powers up to eight channels of pressurization/depressurization with air pressure feedback in order to deploy the robot in outdoor environments. By utilizing this board, embodiments of the present disclosure can provide a fast and efficient air pressure feed-back controller. Taking advantage of the proposed model and pneumatic regulation system, embodiments of the present disclosure can include a closed-loop trajectory tracking method to enable the robot to track variable-height trajectories.

Embodiments of the present disclosure can include: a static model based on geometric constraints for feedforward position control (body height and orientation); a pressure feedback controller based on a custom low-cost pneumatic regulation board with eight channels of pressurization/depressurization, a closed-loop trajectory control method to track variable-height trajectories.

Exemplary Modeling and Parameter Identification

Soft pneumatic robots in accordance with embodiments of the present disclosure can reach high walking speeds (compared to other soft legged robots) across various types of terrain. The robot's robust and resilient walking performance mainly comes from the leg design that can bend and extend to create foot trajectory profiles suitable for legged locomotion (see FIG. 19a, which illustrates a CAD rendering of an exemplary leg design). In fact, walking tests in indicated that the soft pneumatic robots' center of mass (COM) displays trajectories similar to those observed in traditional hexapedal robots and which are often modeled by the spring-loaded inverted pendulum (SLIP) model.

However, the SLIP model is unfeasible to be applied on soft pneumatic legged robots for two reasons. First, the weight of legs of soft pneumatic robot accounts for more than 80% of the total weight (excluding the pneumatic control board). Second, the relatively slow response to pressure inputs make it inappropriate to implement the dynamic modeling of rigid parts. In contrast, prior research on soft pneumatic fingers has shown the feasibility of using geometric models for real-time position control.

Exemplary Static Model

According to embodiments of the present disclosure, a static model based on geometric constraints for each leg (see FIG. 19b, which shows an exemplary static model based on geometric constraints) can be implemented. Embodiments can use one revolute and one prismatic joint to model the bending and extension parts, respectively. Parameters $\theta_i$ and $L_i$ are used to denote joints' values for leg $i=1, \ldots, 6$. Note that $L_i$ include both the length of the extension part and the distance to the cut of the bending part. Using the model for single legs, the whole robot can be modeled. See, for example, FIG. 20a, which illustrates a first position of a soft robot in a quasi-static forward motion according to embodiments of the present disclosure. Six legs are connected to a planar body frame of length $L_B$ and width $W_B$. The length of leg $i$ can be written as $L_0+L_i$ where the $L_0$ is a constant that denotes the distance from the bending part to the robot's frame. The Euler angles of the robot planar frame are used to represent the robot's orientation.

By design, there are two steady states for a single tripod gait: 1) only the extension part actuated (FIG. 20a), and 2) both parts actuated (FIG. 20b). In the first state, the extension parts of the tripod $\{1, 3, 5\}$ elongate and lift the body, then the bending parts are actuated and create angles $\{\theta_1, \theta_3, \theta_5\}$ to propel the robot forward. Both extension parts $L_i$ and bending parts $\theta_i$ depressurize when the other tripod actuates to support the robot.

According to one or more examples of this disclosure, the model can compute the robot's height and orientation with respect to parameters $L_i$ and $\theta_i$. Note that we use the height of the geometric center of the robot's planar frame to denote the robot's height (point o in FIG. 20a) as well as its Euler angles to represent the robot's orientation. Consider tripod 1, 3, 5 is pressurized. Then, the height of the robot can be written as $$h = L_0 + \frac{L_1 + L_5}{2} \tag{i}$$

By design, $L_1=L_3$, $L_4=L_6$ can be set in all phases of the alternating tripod gait. The robot's roll angle along x axis is $$\varnothing = \operatorname{atan}\left(L_5 - L_1, \frac{Wb}{2}\right) \qquad (6)$$

Pressure Model and Parameter Identification

In one or more examples, a feedback pressure control for precise pneumatic regulation can be implemented. This feedback pressure control is described in greater detail below. To derive that controller, the relation between model parameters Li and θi with pressure p, which is needed for the robot's feedforward position control can be determined. Deriving analytically an accurate model of air dynamics in the actuators can be quite complicated; yet, examining the measured experimental data as a function of input air pressure, the model can be approximated using polynomials.

To determine the relation between input pressure and output leg length, a series of extension tests can be performed. For example, the robot can be placed on flat ground, the extension part of the legs can be pressurized within a single tripod, and the pressure1 (kPa) and length (mm) of the actuated legs in steady state can be recorded. Since the robot's legs are not massless and the length of the extension parts is sensitive to the load, preliminary testing can reveal asymmetries to the response of the extension parts on the two sides of a tripod. To study this asymmetry within a tripod, the two sides of a tripod (i.e. the side with one leg and the other side with two legs) separately can be tested separately. Within these two cases, two sub-cases can be studied, in which the legs of the not-active side are either not actuated or pressurized at a constant pressure of 30 kPa, which is used in the experiments. The four considered cases and their respective notations are contained in Table II. Note that in double-leg cases, the length of both legs can be measured and the average recorded.

TABLE II

TEST CASES FOR EXTENSION PART MODELING onew/o Single-leg tripod side actuated, other side not actuated
one$_{w/}$ Single-leg tripod side actuated, other side pressurized (30 kPa)
two$_{w/o}$ Double-leg tripod side actuated, other side not actuated
two$_{w/}$ Double-leg tripod side actuated, other side pressurized (30 kPa)

sampling interval of 4 kPa can be applied. Four distinct measurements can be taken for every sampled pressure input. FIG. 4 depicts mean values and one-standard deviations for all four cases shown in Table I. As shown in the figure, experimental results confirm asymmetries on two sides of the tripod. Moreover, the double-leg tripod side is observed to have larger decrease in the elongation with the same positive pressure when the other side pressurized while the single-leg tripod side displays a larger decrease in length with the same negative pressure.

Figure 21:
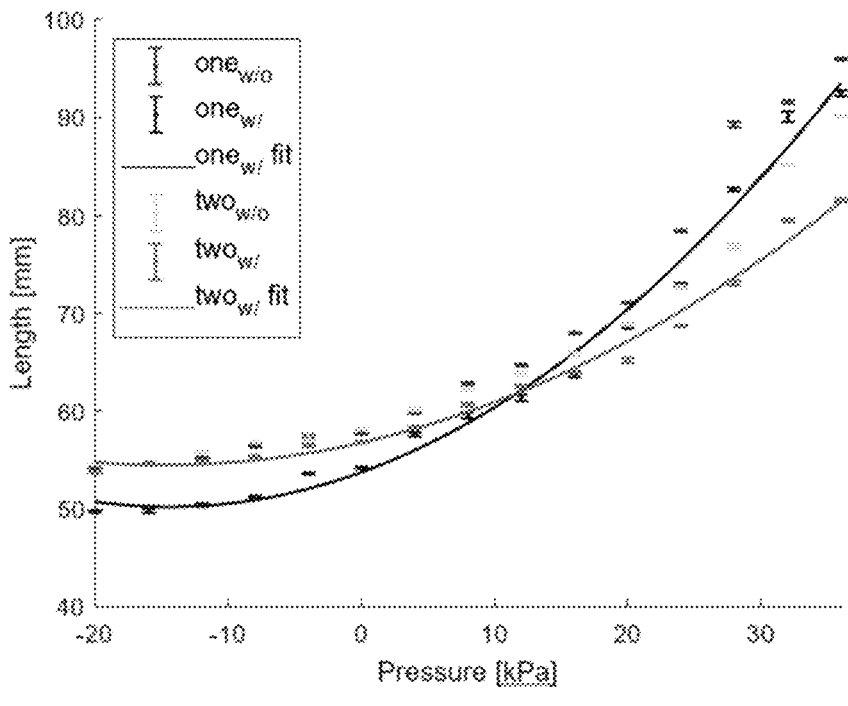
FIG. 21 shows relations between input pressure and output leg length according to one or more embodiments of this disclosure.

In one or more examples, approximate relations can be selected where the other sides are actuated (one$_w$, two$_w$) as the pressure models since two sides of the tripod are actuated for most of the tests. Experimental results show that the relations can be approximated by second-order polynomials. The curves are plotted in FIG. 21 as one$_w$/fit and two$_w$/fit. On the other hand, for the angle θ model, the relation between input pressure and bending angle θ can be approximated, as discussed above. Polynomial coefficients for all models are listed in Table III. $R^2$ values of the three models are calculated to validate the fitting performance; $R^2 one_w=0.9877$, $R^2 two_w=0.9878$ and $R^2_\theta=0.9691$.

TABLE III

POLYNOMIAL COEFFICIENTS FOR MODEL FITTING

| Models | Polynomials | Units | Ranges |
|---|---|---|---|
| one$_{w/}$ | $0.017p^2 + 0.492p + 53.801$ | mm | [−20, 36] kPa |
| two$_{w/}$ | $0.010p^2 + 0.309p + 56.821$ | mm | [−20, 36] kPa |
| θ | $0.010p + 0.0153$ | rad | [−20, 50] kPa |

Controller Design—Pneumatic Regulation Board

According to one or more embodiments of this disclosure, the soft pneumatic robot can be driven by a modified version of an open-source pneumatic control board. In that board, every air output channel was connected to two pairs of valves and pumps to allow for both pressurization and depressurization. Instead of free-flow passive deflation, active depressurization significantly improves the walking performance since it can accelerate bending legs to recover to upright configurations. At the same time, active depressurization can further shorten the extension parts, thus increasing foot clearance to facilitate overcoming obstacles. The pneumatic regulation board proposed herein builds upon principles of the previous configuration and also includes pressure sensors to provide feedback.

Figure 22:
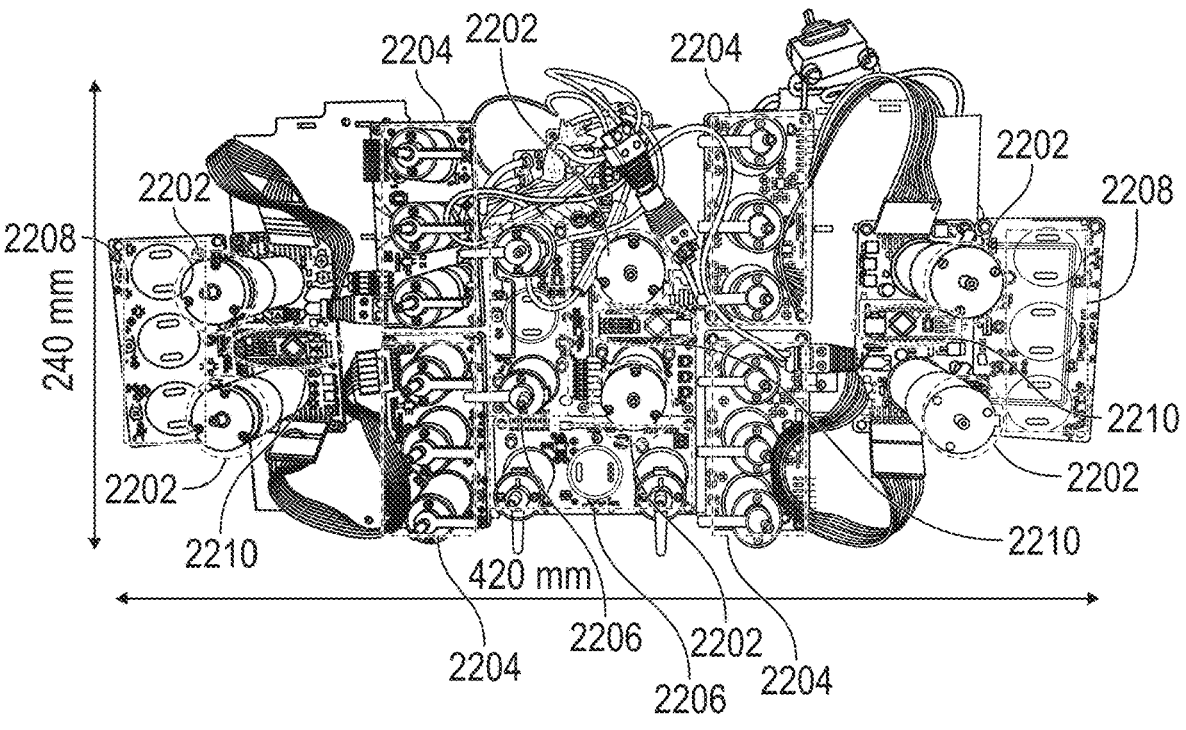
FIG. 22 shows a top view of the developed pneumatic regulation board, according to one or more embodiments of this disclosure
Figure 32:
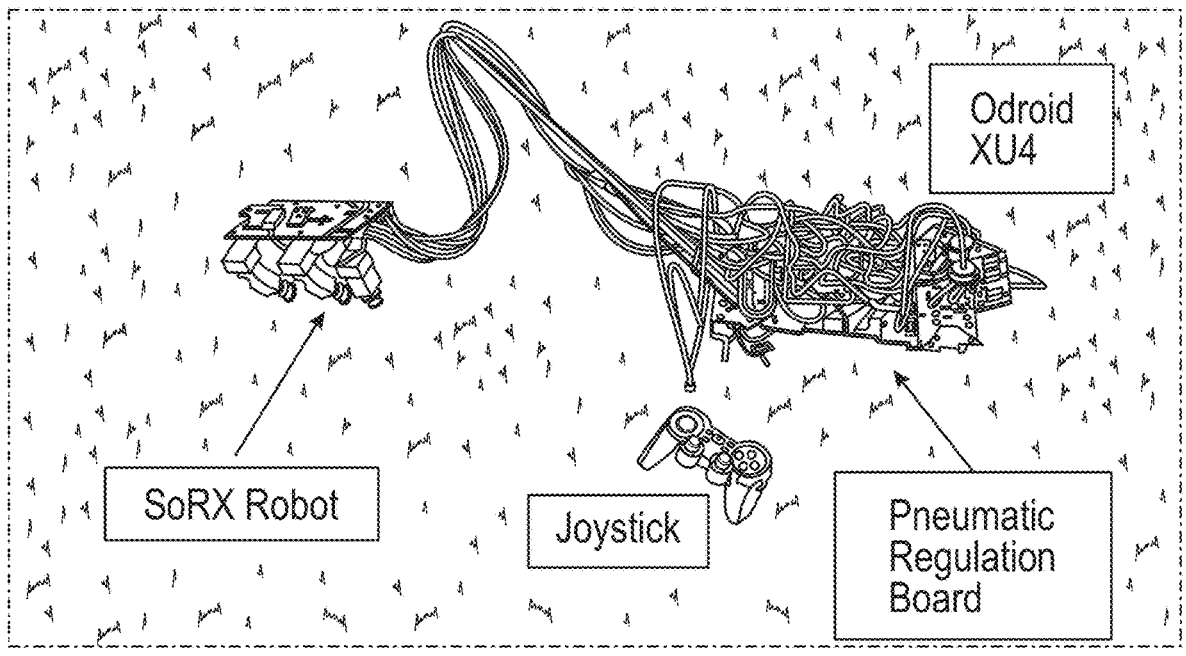
FIG. 32 shows a soft robot operating outdoors, according to one or more embodiments of this disclosure

According to one or more embodiments, custom printed circuit boards (PCBs) for the pneumatic regulation board can be used to minimize size and weight. The PCB design is based on a portable open-source pneumatic controller 3 with minor changes to the operational amplifier circuit for pressure sensors. A top view of a pneumatic regulation board according to embodiments of this disclosure is shown in FIG. 22. As shown in the figure, there are in total six pumps 2202 and sixteen solenoid valves on the board. Half of the solenoid valves are used for pressurization; the other half are responsible for depressurization. According to some embodiments, there can be three types of valve boards: 1) boards with three valves and one pressure sensor 2204, 2) boards with two valves and one pressure sensor 2206, and 3) boards with only one pressure sensor 2208. Three micro-controllers (Arduino Nano, 2210) can coordinate with the companion computer (Odroid XU4 [not shown]) to read pressure values as well as control valves and pumps. Electronics are powered by a 3500 mAh 3-cell LiPo battery. The board has a compact design (240 mm L×420 mm W×140 mm H), and weighs 1.7 kg. Compared to previous boards, the board shown in FIG. 22 can be more compact, but with eight output channels, e.g., twice the number of output channels as previous boards. In some embodiments, the board can be fitted with casters for portability and ease of use in experiments, e.g., as shown in FIG. 32.

Figures 23, 24:
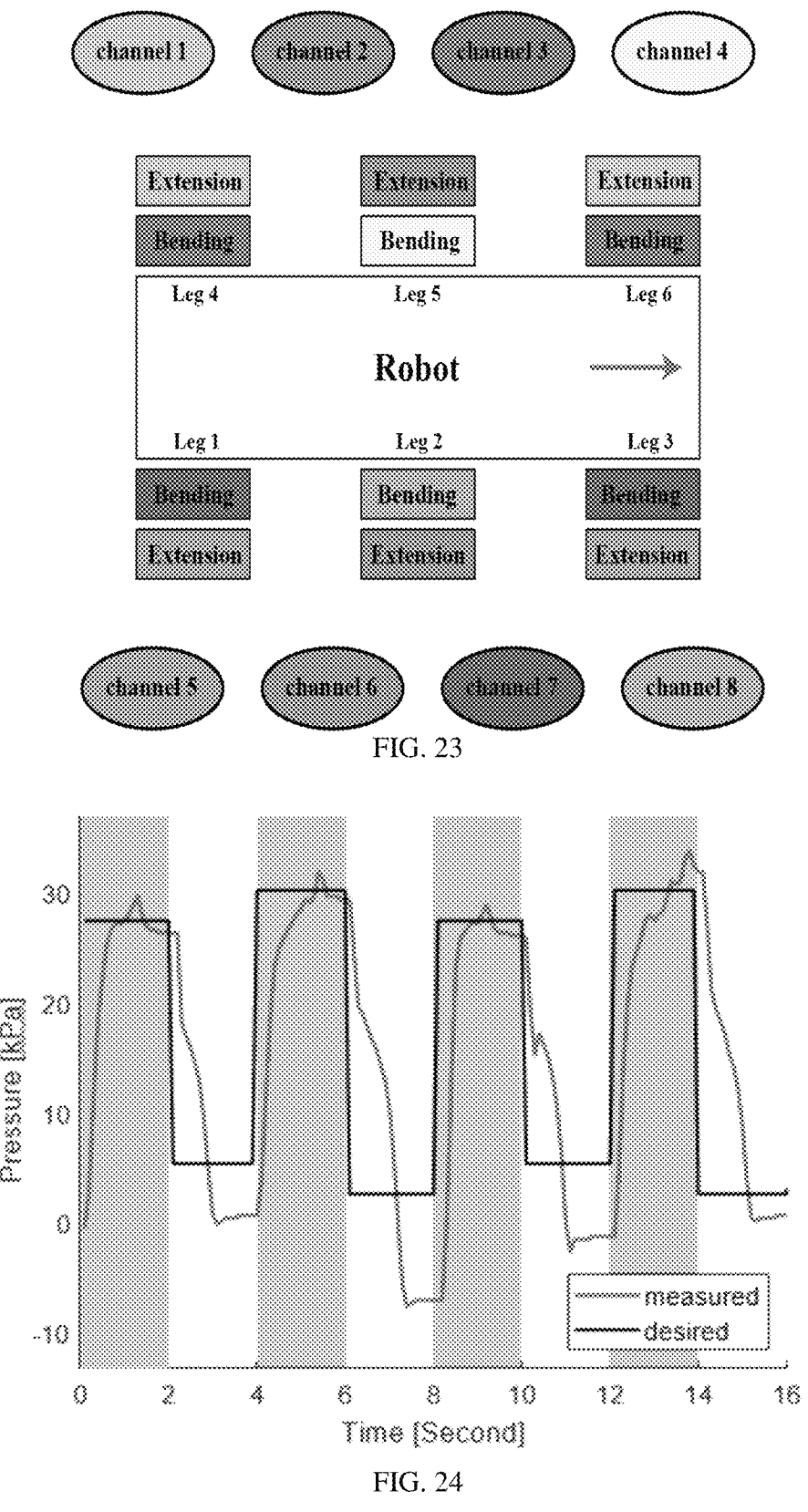
FIG. 23 shows a diagram of eight air output channels to drive actuation parts, according to one or more embodiments of this disclosure
FIG. 24 shows a step response for the proposed pressure feedback controller according to one or more embodiments of this disclosure

Compared to boards that include four air output channels, a pneumatic regulation board according to embodiments of the present disclosure can implement eight channels in total to introduce more motion capabilities for soft pneumatic robot (specifically, body orientation and turning). In one or more examples, four additional channels are used to address the body orientation control and turning. FIG. 24 depicts the airflow logic for the pneumatic regulation in this work. FIG. 23 shows a diagram of eight air output channels to drive 12 actuation parts (six extension parts and six bending parts). In one or more examples, channel 1 is connected to extension parts of leg 4 and leg 6; channel 2 is connected to extension part of leg 5; channel 3 is connected to bending parts of leg 4 and leg 6; channel 4 is connected to bending part of leg 5;

channel 5 is connected to extension parts of leg 1 and leg 3, channel 6 is connected to extension part of leg 2; channel 7 is connected to bending parts of leg 1 and leg 3; and channel 8 is connected to bending part of leg 2. There are in total eight air output channels and six legs each comprising two actuated parts (extension and bending parts). By design, the extension parts and the bending parts of the two outer legs on the same side are connected and operated with the same pressure input (that is, pairs {Leg 1 & Leg 3} and {Leg 4 & Leg 6}). The two parts of the middle legs (i.e. Leg 2 and Leg 5) are separately actuated with four additional channels.

Controller Design—Pressure Feedback Controller

In one or more examples, the pneumatic regulation board, pressurization and depressurization can be attained by different pairs of pumps and valves. Because of this, there can be significant delays when transitioning between actuation modes. Existing feedback control methods (e.g., PID controllers) based on pressure values alone failed in preliminary experimental tests, causing oscillations when the pressure is close to zero.

To mitigate this challenge, embodiments according to the present disclosure include a feedback controller to achieve relatively fast and precise pressure control and avoid oscillations. In one or more examples, desired trajectories of each air output channel consist of two values: "mode" and "desired." The "mode" value can be configured to pressurize or depressurize, while the "desired" value can correspond to desired pressure values in the steady state.

---

Algorithm 1: Pressure Feedback Controller

---

Given: total time T, threshold $\epsilon$;
Input: the desired trajectories ($mode_t$, $desired_t$),
pressure feedback values $real_t$ at time t;
while t ≤ T do
    if $mode_t$ == pressurize then
        if $real_t$ < $desired_t$ – $\epsilon$ and $Valve_1$ == closed
        then
            $Valve_1$ ← open;
            $Pump_1$ ← on;
        if $real_t$ ≥ $desired_t$ and $Valve_1$ == on then
            $Valve_1$ ← closed;
                $Pump_1$ ← off;
    else
        if $real_t$ > $desired_t$ + c and $Valve_2$ == closed
        then
            $Valve_2$ ← open;
            $Pump_2$ ← on;
        if $real_t$ ≤ $desired_t$ and $Valve_2$ == on then
            $Valve_2$ ← closed;
            $Pump_2$ ← off;

---

The pseudo code for single-channel pressure feedback control is detailed in Algorithm 1. Two pumps and two valves contribute to the regulation of each air output channel. Let Valve1 and Pump1 be used for pressurization while the rest take charge during depressurization. All pumps and valves are closed by default. Note that the algorithm uses a threshold e to avoid oscillations. Thresholds for each channel are empirically tuned. In general, the bending parts are more sensitive to pressure changes; therefore, larger thresholds are applied therein.

The performance of the pressure feedback controller is evaluated by a step response test. In the experiment, a single extension part was actuated to track step trajectories with the proposed pressure feedback controller. The desired and measured air pressure values are shown in FIG. 25. The grey boxes represent that the mode is pressurize while the white ones denote depressurize.

As shown in the figure, the measured pressure in the steady state is generally tracking the positive desired one with small overshoot. However, when the desired pressure is close to or smaller than zero, large tracking errors are observed in the steady state. Mismatches in negative pressure are caused because pressure decreases very fast when the volume of the air chamber is close to its minimum. However, based on FIG. 21, negative pressure values have little impact to the overall leg length. Hence, when the desired pressure is close to or less than zero tracking errors can have acceptable impact to the motion control of the robot.

Trajectory Tracking—Walking and Turning

Embodiments according to embodiments of this disclosure can utilize the same actuation sequence as discussed above for causing the soft pneumatic robot to walk (see FIG. 25a). Notations E and B represent extension and bending parts, respectively. Stippled boxes are used to represent pressurization, while the empty boxes represent depressurization. In the walking task, each tripod is actuated for half of the clock phase. During the actuation of each tripod, the extension parts are pressurized first and hold the pressure, followed by pressurization of the bending parts.

Compared to rigid robots, soft pneumatic robots rely on leg's shape morphing to move, thus existing turning methods for hexapedal and octapedal robots with coupled leg motion, were not successful in our preliminary experimental tests. To this end, embodiments of the present disclosure adopt in this work a simple yet effective turning method for the robot. FIG. 25b shows a sample actuation sequence for making a left turn. Actuation sequences for the extension parts remain the same as in normal walking; however, the bending parts of two legs opposite to the turning direction are actuated. The difference in the actuation of bending parts within a tripod enables the robot to turn while the elongation of the extension parts of the other tripod assists legs to recover to upright configurations. FIG. 26 shows snapshots from a sample turning trajectory of the robot. Observations suggest that the bending part of leg 5 still curves passively due to the weight, however, actuation of two legs on the other side enables the robot to turn. A full actuation sequence enables the robot to turn by approximately 10°.

The robot's walking speed is determined via the time of a clock phase in FIGS. 25a and 25b. To achieve accurate pressure control, a longer phase (6.6 sec) is used compared to the one in described above (1.6 sec). As a result, the pressure feedback-enabled walking speed of the robot (without turnings) is approximately 24.5 mm/s (0.11 BL/s), compared to the open loop speed of 101 mm/s (0.44 BL/s) reported in above. When turning, the speed of the robot is further slowed down because the robot moves forward during only half of the clock phase. FIG. 26 shows composite images of a sample test on turning.

Closed-Loop Trajectory Tracking

Figure 27:
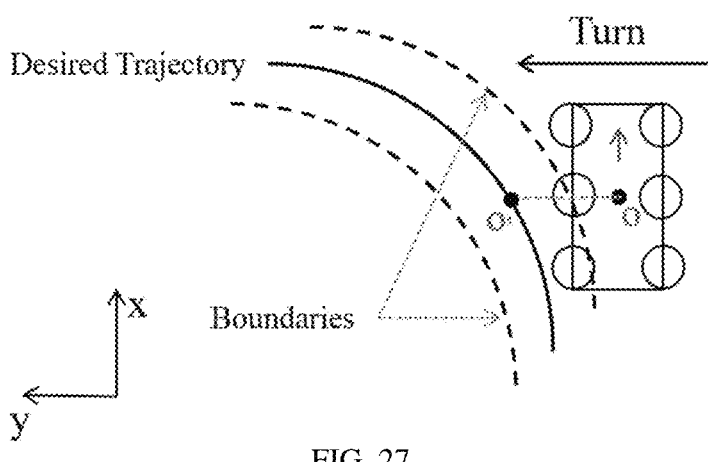
FIG. 27 shows a closed-loop trajectory tracker according to one or more embodiments of this disclosure.

The significance of the developed turning method is that turning enables implementation of closed-loop trajectory tracking control for the first time in the context of soft legged robots. The approach discussed herein is a direct and effective means that relies on trajectory corridors. Consider a desired trajectory containing 3D positions (x, y, z) as shown in FIG. 27. Along with the desired trajectory, we prescribe a 2D corridor (black dashed lines), which is defined to lie at a fixed, user-defined distance from the desired trajectory's projection on the x-y plane.

In one or more examples, the robot receives location data from motion capture at 100 Hz and compares the 2D position (the geometric center of the planar body) with the boundaries of the corridor at a rate of 10 Hz. When the center is located outside of the boundaries, the robot will trigger the turning method to move toward the desired trajectory, until the center is found across the desired trajectory. For instance, FIG. 27 is sketched to show the center (point o) being outside the right boundary, thus the turning method drives the robot to turn left. Given the current location (point o) from the motion capture system, we map it to the desired trajectory (point o'). In one or more examples, point o is found using the same y values for simplicity as the robot tracks a straight line alone x axis, however, the minimal distance with coordinate transformations can be used for mapping complex trajectories. The height of the mapped point z(o') is used as the desired height of the robot at the current location. The desired air pressure is calculated based on models in Table IV, and sent to the pressure feedback controller.

Exemplary Experimental Evaluation

Embodiments of the present disclosure were tested in indoor and (proof-of-concept) outdoor experiments. In indoor tests, the proposed model-based position control and closed-loop trajectory tracking on the soft pneumatic robot was tested. The position of the robot is captured using a 12-camera Optitrack motion capture system. A desktop (Intel NUC 10 with 2.3 GHZ i7 CPU) is used as the companion computer. The robot operates on flat ground. Values for key parameters used in the paper are listed in Table IV. Note that EB and CE are the thresholds for bending and extension parts used in Alg. 1, respectively. In outdoor tests, we evaluate the preliminary feasibility of manually controlled navigation over unstructured terrain for the robot.

TABLE IV

| KEY PARAMETERS AND THEIR VALUES | | | | |
|---|---|---|---|---|
| LB | WB | L0 | $\epsilon$B | $\epsilon$E |
| 230 mm | 140 mm | 65 mm | 10 kPa | 5 kPa |

Experimental Evaluation—Position Control

Two experiments were conducted to evaluate the proposed static models described above. In the first test, the robot is placed on the ground, and one tripod is controlled to change the height of the center (point o). The largest desired height of 132 mm is achieved when all extensions parts are pressurized while the lowest desired height of 120 mm corresponds to the state of depressurization of the tripod.

Desired pressure values are determined based on Equation 5 and the polynomials models in Table III. In one or more examples, the legs for both sides of the tripod have the same length by design. Based on the fitting models, the max and min pressure values 19.75 and 8.11 kPa for the extension parts on double-leg tripod side was calculated, while 16.93 and 2.26 kPa for the single-leg side. The desired pressure values to the pressure feedback controller with a time interval of 2 sec was captured and record the height from the motion capture system.

Figure 28:
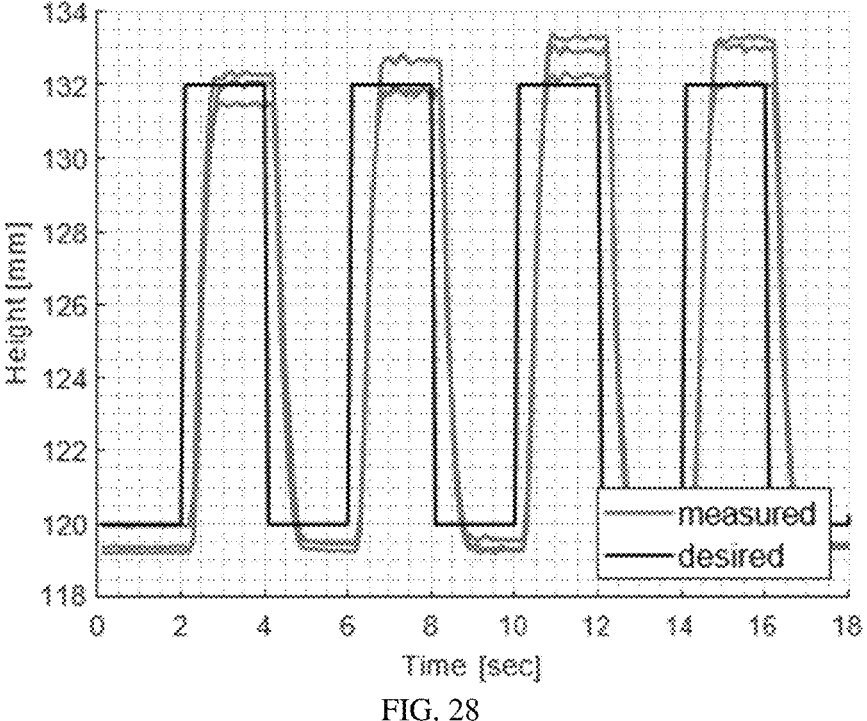
FIG. 28 shows desired and measured values for the height of the robot's center.

FIG. 28 presents both desired and measured height of the robot's center for three consecutive experimental trials. Although delays and relatively small steady errors are observed, results suggest the height of the center is tracking the desired trajectories with the proposed methods.

Figure 29:
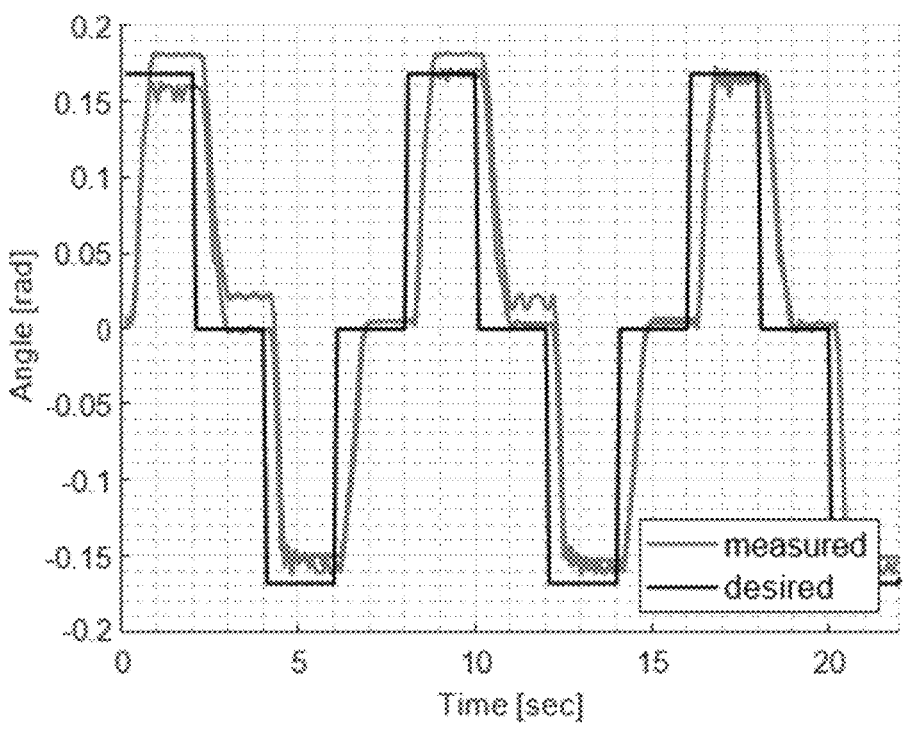
FIG. 29 shows desired measured the roll angle φ for the robot's planar body.

Similarly, the same desired pressure inputs were used to evaluate Equation 6. Given the difference between two extreme heights ($L_5$ $L_1$=12 mm), calculate the roll angle $\phi$=arctan ($2(L_5$ $L_1)/W_B$)=0.17 rad can be calculated. Three consecutive tests are conducted and results are shown in FIG. 29. The measured roll angles are in general tracking the desired ones despite delays and steady errors introduced by the pressure controller and model fitting.

Experimental Results—Trajectory Tracking

Two experiments to validate the proposed closed-loop trajectory tracking control were conducted. In the first test, only the 2D position of the robot is considered. We command the robot to track two planar trajectories: 1) a straight line, and 2) a quarter circle.

Figure 30:
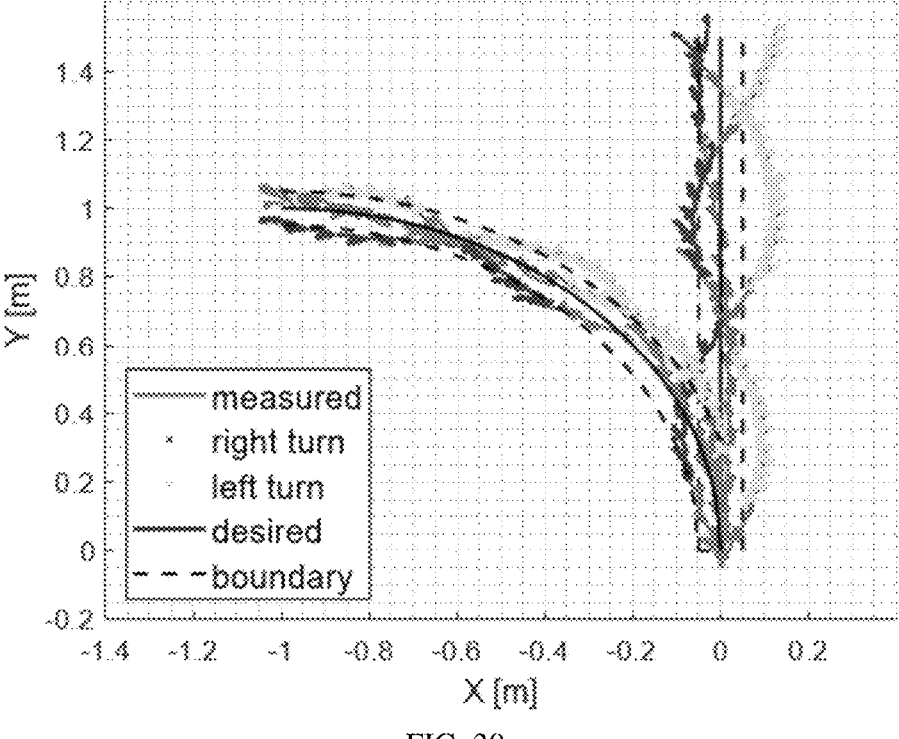
FIG. 30 shows experimental results for closed-loop 2D trajectories tracking.

In the straight-line case, the robot starts at the origin and is expected to reach the point (0, 1.5) m; the robot stops after reaching the line y=1.5 m. The boundaries are set at x=0.05 m. Three consecutive experimental trials are made with different starting angles (0, 15°). The desired and measured trajectories for all trials are shown in FIG. 30, where the right turn dots and the left turn dots denote components of the robot trajectory during which the tracker sends right and left turning commands, respectively. Results show that the robot walks generally in straight line without steering control with a zero starting angle, until reaching a distance of 1.2 m followed by right turns. Further, the effectiveness of the method is validated with 15° starting angles. Results show that the robot walks outside of the boundaries shortly after the start; however, the trajectory tracking method drives the robot to move toward the desired trajectory with repeating changes of right/left turning sequences.

A desired trajectory of quarter circle $(x+1)^2+y^2=1$, x [1, 0] is set for the second experiment. Similarly, two boundaries $(x+1)^2+y^2=(1\ 0.05)^2$ are selected to trigger turning. The desired trajectory begins at the origin and moves toward the destination (1, 1) m, where the robot stops after reaching the line x=1 m. Three experimental trials are conducted with zero starting angles. Results in FIG. 30 demonstrate that the proposed method enables the soft robot to track both straight-line and turning trajectories.

Figure 31:
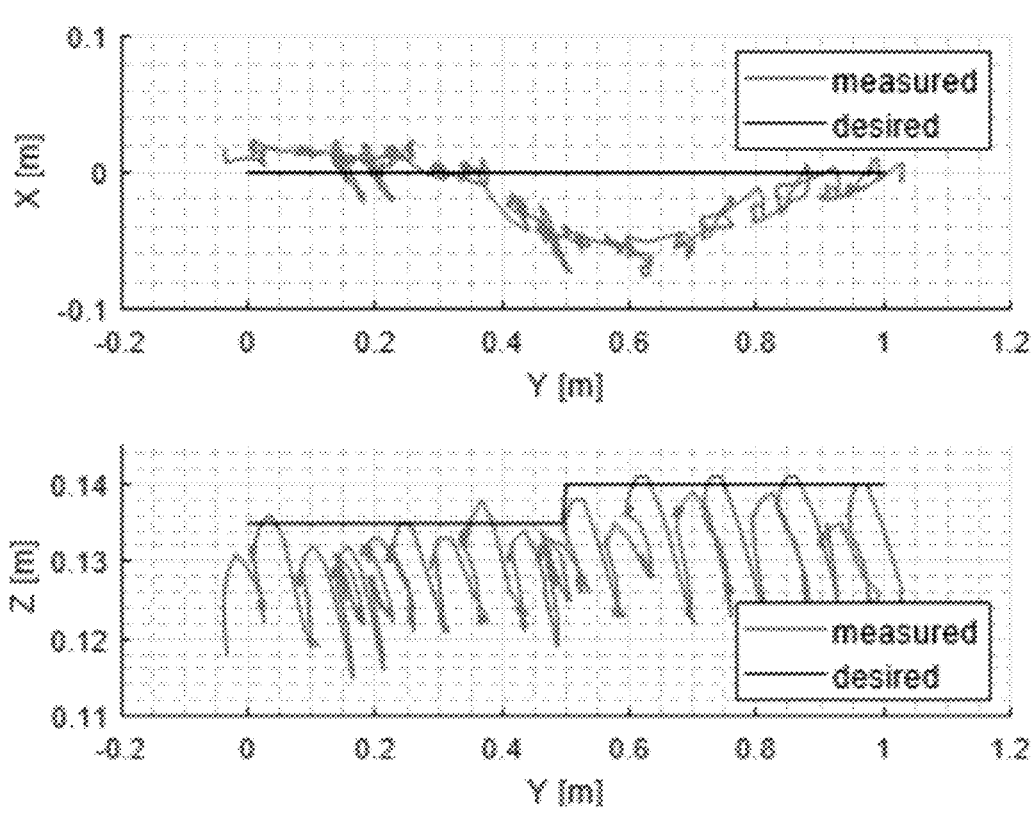
FIG. 31 shows desired and measured positions in variable-height trajectory tracking.

For the second experiment, we command the robot to track a variable-height trajectory. The trajectory consists of a planar straight line from the origin to the point (0, 1) m, with the desired maximal height switching from 0.135 to 0.140 m after reaching the line y=0.5 m. Tests are made with zero starting angles. The desired and measured trajectories of the robot are shown in FIG. 31. Given the two steady states for the walking task, oscillations in the height of the robot's center are observed along the trajectories. However, results indicate the utility of methods according to embodiments of this disclosure to track variable-height trajectories since the maximal heights of the robot's center switch after passing the line y=0.5 m, as desired.

Experimental Results—Tracking Performance

Table V presents various experiments including pressure feedback control, position control, and trajectory tracking. Note that the distance of the measured positions to the desired trajectories for both line and curve tracking experiments are used. For instance, $d_1$ denotes the absolute value of the measured x for the straight line tracking test. For the variable-height trajectory tracking test, the 2D straight line tracking error $d_3$ is listed, as well as the height difference $h_2$ between desired and measured values for the locally maximal points.

TABLE V

| TRACKING PERFORMANCE | | |
| --- | --- | --- |
| Variables | Tracking Errors | Units |
| Step Response p | −0.737 ± 11.198 | kPa |
| Position Control Height $h_1$ | −0.263 ± 4.910 | mm |
| Position Control Angle $\phi$ | 0.006 ± 0.073 | rad |
| Trajectory Tracking Line $d_1$ | 0.029 ± 0.019 | m |
| Trajectory Tracking Curve $d_2$ | 0.045 ± 0.020 | m |
| Trajectory Tracking Variable-Height $d_3$ | 0.024 ± 0.020 | m |
| Trajectory Tracking Variable-Height $h_2$ | −1.474 ± 2.245 | mm |

Experimental Results—Feasibility for Outdoor Field Testing

Taking advantage of the compact and portable design of a pneumatic regulation board according to embodiments of the present disclosure, a soft pneumatic robot can operate in outdoor environments. FIG. 32 shows a snapshot from preliminary field tests. An Odroid XU4 coordinates with the board; walking and steering is remote-controlled. Powered by the untethered board, the soft pneumatic robot can operate on various types of natural rough terrain; including creeks and gravel (see FIG. 18).

Accordingly, embodiments according to embodiments of this disclosure can extend the motion capabilities of a soft pneumatic legged robot, which has shown able to traverse rough, steep and unstable terrain. Specifically, embodiments according to embodiments of this disclosure include a static model based on geometric constraints for feedforward position control, and designed and implemented a compact and portable pneumatic regular board that powers up to eight channels of pressurization/depressurization with pressure feedback. Further, embodiments according to embodiments of this disclosure include a pressure feedback controller, as well as a closed-loop variable-height trajectory tracking control method, that utilize the pneumatic regulation board to enable the robot to track straight-line and curving trajectories.

Experimental testing indoors revealed that the disclosed system and methods can enable effective fully-pneumatic feedback trajectory tracking control for soft pneumatically-actuated legged robots. In addition, preliminary feasibility tests indicated that the developed board and controller can facilitate (remote-controlled) operation of the robot over unstructured terrain as well.

Accordingly, embodiments of the present disclosure can provide a multi-legged robot configured to traverse a variety of surfaces. In one or more examples, embodiments of the present disclosure can provide a multi-legged robot, wherein the multi-legged robot is configured to move at a speed of between 0.15 and 0.44 body-lengths per second on a flat surface. In one or more examples, embodiments of the present disclosure can provide a multi-legged robot, wherein the multi-legged robot is configured to climb an obstacle, the obstacle having a height between 5 mm and 15 mm. In one or more examples, embodiments of the present disclosure can provide a multi-legged robot, wherein the multi-legged robot is configured to traverse sandy terrain at a speed between 0.035 and 0.17 body-lengths per second. In one or more examples, embodiments of the present disclosure can provide a multi-legged robot, wherein the multi-legged robot is configured to traverse rocky terrain at a speed between 0.035 and 0.20 body-lengths per second. In one or more examples, embodiments of the present disclosure can provide a multi-legged robot, wherein the multi-legged robot is configured to traverse an incline between 0 and 10 degrees. In one or more examples, embodiments of the present disclosure can provide a multi-legged robot, wherein the multi-legged robot is configured to traverse a grooved incline between 0 and 15 degrees. In one or more examples, the multi-legged robot is configured to traverse an unstable terrain, wherein the unstable terrain oscillates in the X and Y directions.

Accordingly, embodiments of the present disclosure can provide a multi-legged robot that includes a one or more of pairs of actuators. In one or more example, the one or more pairs of actuators is configured to support a weight of the multi-legged robot. In one or more examples, each actuator is formed from silicone. In one or more examples, each actuator includes a first portion and a second portion. In one or more examples, the first portion has a first shape and the second portion has a second, different shape. In one or more examples, the second portion comprises at least one set of bellows. In one or more examples, the multi-legged robot includes three pairs of actuators.

In one or more examples, methods according to this disclosure can comprise: providing a multi-legged robot in an initial state, wherein the multi-legged robot includes at least one pair of actuators, the at least one pair of actuators having a first actuator and a second actuator; activating the first actuator in each of the at least one pairs of actuators, wherein activating the first actuator comprises: receiving a first fluid via a first inlet coupled to a first chamber of a first portion of the first actuator; in response to receiving the first fluid, bending the first portion of the first actuator; receiving a second fluid via a second inlet coupled to a second chamber of a second portion of the first actuator; in response to receiving the second fluid, extending the second portion of the first actuator; and depressurizing the first and second chambers.

In examples, according to the method described above, the first chamber is pressurized at a first time and the second chamber is pressurized at a second time. In such examples, the second inlet is closed while the first chamber receives the first fluid.

In examples, according to the method described above, the first and second chambers are depressurized at a third time. In such examples, depressurizing the first and second chambers returns the first actuator to the initial state.

In examples, according to the method described above, the method can further comprise: activating the second actuator in each of the at least one pairs of actuators, wherein activating the second actuator comprises: receiving a first fluid via a first inlet coupled to a first chamber of a first portion of the second actuator; in response to receiving the first fluid, bending the first portion of the second actuator; receiving a second fluid via a second inlet coupled to a second chamber of a second portion of the second actuator; in response to receiving the second fluid, extending the second portion of the second actuator; and depressurizing the first and second chambers.

In examples, according to the method described above, the multi-legged robot is configured to traverse at least one selected from a flat surface, a sandy surface, an incline, a grooved incline, and an oscillating surface based on a cycle of activating the first actuator and the second actuator in each of the at least one pairs of actuators. In such examples, in response to receiving the second fluid and extension of the second portion, the first portion is configured to bend by an additional, second amount.

In examples, according to the method described above, the sequence of activating the first actuator and the second actuator in each of the at least one pairs of actuators is configured to cause the multi-legged robot to turn.

Examples of the present disclosure can include methods comprising: receiving a first fluid via a first fluid inlet coupled to a first chamber of a first portion of a pliable body; in response to receiving the first fluid, bending the first portion of the pliable body by a first amount; receiving a second fluid via a second fluid inlet coupled to a second chamber of a second portion of a pliable body; in response to receiving the second fluid, extending the second portion of the pliable body; and depressurizing the first and second chambers.

In examples, according to the method described above, the first chamber is pressurized at a first time and the second chamber is pressurized at a second time. In examples, according to the method described above, the first and second chambers are depressurized at a third time. In examples, according to the method described above, in response to receiving the second fluid, the first portion is configured to bend by an additional, second amount. In examples, according to the method described above, the sequence of activating the first actuator and the second actuator in each of the at least one pairs of actuators is configured to cause the multi-legged robot to turn.

What is claimed is:

1. A multi-legged robot comprising:
    at least one pair of actuators, wherein each actuator includes:
        a pliable body having:
        a first portion comprising a first chamber;
        a second portion comprising a second chamber, the second portion coupled to a distal end of the first portion;
        a first inlet coupled to the first chamber, wherein the first portion is configured to bend upon receiving a first fluid via the first inlet; and
        a second inlet coupled to the second chamber, wherein the second portion is configured to extend upon receiving a second fluid via the second inlet; and
    a frame coupled to a proximate end of the first portion of each actuator, wherein:
        to cause the multi-legged robot to walk:
            the first chamber is pressurized at first clock phases, and
            the second chamber is pressured at second clock phases, and
        to cause the multi-legged robot to turn:
            the first chamber is pressurized at third clock phases, and
            the second chamber is pressurized at fourth clock phases.

2. The multi-legged robot of claim 1, further comprising a pneumatic pump coupled to the first and second inlet, wherein the pneumatic pump is configured to provide the first chamber with the first fluid and second chamber with the second fluid.

3. The multi-legged robot of claim 1, wherein the first portion comprises at least one notch such that the first portion is configured to bend at the at least one notch.

4. The multi-legged robot of claim 1, wherein the at least one pair of actuators includes a first actuator and a second actuator, the at least one pair of actuators configured to operate one of the first actuator and second actuator at a time.

5. The multi-legged robot of claim 1, wherein a wall thickness of the first chamber of the first portion is greater than a wall thickness of the second chamber of the second portion.

6. The multi-legged robot of claim 1, further comprising a controller board, wherein the controller board is configured to actively depressurize the first chamber and the second chamber.

7. The multi-legged robot of claim 1, further comprising a controller board, the controller board comprising:
    a plurality of pumps, each pump associated with each actuator; and
    a plurality of solenoids, wherein a first portion of the plurality of solenoids are configured to pressurize one or more actuators and a second portion of the plurality of solenoids are configured to depressurize one or more actuators.

8. A method of operating a multi-legged robot, the method comprising:
    providing a multi-legged robot in an initial state, wherein the multi-legged robot includes at least one pair of actuators, the at least one pair of actuators having a first actuator and a second actuator;
    activating the first actuator in each of the at least one pairs of actuators, wherein activating the first actuator comprises:
        receiving a first fluid via a first inlet coupled to a first chamber of a first portion of the first actuator;
        in response to receiving the first fluid, bending the first portion of the first actuator;
        receiving a second fluid via a second inlet coupled to a second chamber of a second portion of the first actuator, the second portion coupled to a distal end of the first portion;
        in response to receiving the second fluid, extending the second portion of the first actuator; and
        depressurizing the first and second chambers, wherein:
            to cause the multi-legged robot to walk:
                the first chamber is pressurized at first clock phases, and
                the second chamber is pressured at second clock phases, and
            to cause the multi-legged robot to turn:
                the first chamber is pressurized at third clock phases, and
                the second chamber is pressurized at fourth clock phases.

9. The method of claim 8, wherein the first and second chambers are depressurized at a third time.

10. The method of claim 8, further comprising:
    activating the second actuator in each of the at least one pairs of actuators, wherein activating the second actuator comprises:
        receiving a first fluid via a first inlet coupled to a first chamber of a first portion of the second actuator;
        in response to receiving the first fluid, bending the first portion of the second actuator;
        receiving a second fluid via a second inlet coupled to a second chamber of a second portion of the second actuator;
        in response to receiving the second fluid, extending the second portion of the second actuator; and
        depressurizing the first and second chambers.

11. The method of claim 10, wherein in response to receiving the second fluid and extension of the second portion, the first portion is configured to bend by an additional, second amount.

12. The method of claim 8, wherein the sequence of activating the first actuator and the second actuator in each of the at least one pairs of actuators is configured to cause the multi-legged robot to turn.

13. A method of actuating a soft actuator, the method comprising:

receiving a first fluid via a first fluid inlet coupled to a first chamber of a first portion of a pliable body;

in response to receiving the first fluid, bending the first portion of the pliable body by a first amount;

receiving a second fluid via a second fluid inlet coupled to a second chamber of a second portion of a pliable body, the second portion coupled to a distal end of the first portion;

in response to receiving the second fluid, extending the second portion of the pliable body; and depressurizing the first and second chambers, wherein:

to actuate the pliable body for walking:

the first chamber is pressurized at first clock phases, and the second chamber is pressured at second clock phases, and to actuate the pliable body for turning:

the first chamber is pressurized at third clock phases, and the second chamber is pressurized at fourth clock phases.

14. The method of claim 13, wherein the first and second chambers are depressurized at a third time.

15. The method of claim 13, wherein in response to receiving the second fluid, the first portion is configured to bend by an additional, second amount.

16. The method of claim 13, wherein the sequence of activating the first actuator and the second actuator in each of the at least one pairs of actuators is configured to cause the multi-legged robot to turn.

\* \* \* \* \*